United States Patent
Baba et al.

(10) Patent No.: US 9,579,734 B2
(45) Date of Patent: Feb. 28, 2017

(54) MULTI-FLUTE ENDMILL

(75) Inventors: Makoto Baba, Yasu (JP); Jun-ichi Hirai, Hitachi (JP)

(73) Assignee: MITSUBISHI HITACHI TOOL ENGINEERING, LTD., Tokyo (JP)

( * ) Notice: Subject to any disclaimer, the term of this patent is extended or adjusted under 35 U.S.C. 154(b) by 279 days.

(21) Appl. No.: 14/126,797

(22) PCT Filed: Dec. 27, 2011

(86) PCT No.: PCT/JP2011/080208
§ 371 (c)(1),
(2), (4) Date: Mar. 24, 2014

(87) PCT Pub. No.: WO2012/172710
PCT Pub. Date: Dec. 20, 2012

(65) Prior Publication Data
US 2014/0205390 A1    Jul. 24, 2014

(30) Foreign Application Priority Data

Jun. 17, 2011    (JP) .................................. 2011-134685

(51) Int. Cl.
*B23C 5/10* (2006.01)
(52) U.S. Cl.
CPC ........ *B23C 5/10* (2013.01); *B23C 2210/0442* (2013.01); *B23C 2210/08* (2013.01);
(Continued)
(58) Field of Classification Search
CPC ............ B23C 2210/08; B23C 2210/32; B23C 2210/40; B23C 5/10
See application file for complete search history.

(56) References Cited

U.S. PATENT DOCUMENTS 3,775,819 A * 12/1973 Ribich ...................... B23C 5/10
407/53
5,085,540 A * 2/1992 Pagliaccio ............ B23B 31/005
407/11

(Continued)

FOREIGN PATENT DOCUMENTS

DE    20 2009 013 808.9    3/2010
DE    202013003224 U1 *    6/2013    ............... B23C 5/10

(Continued)

OTHER PUBLICATIONS

International Search Report mailed Mar. 6, 2012 in corresponding International Application No. PCT/JP2011/080208.

(Continued)

*Primary Examiner* — Sunil K Singh
*Assistant Examiner* — Donte Brown

(57) ABSTRACT

A multi-flute endmill including a cutting edge part having multiple cutting edges and flutes formed between adjacent cutting edges in a rotation direction around the tool axis O. A rake face of each cutting edge is formed from a rake face of an end cutting edge from the tool axis O side to the outer peripheral side of a shank, an adjacent rake face of a corner R edge that forms a surface different from the rake face of the end cutting edge, and an adjacent rake face of a peripheral cutting edge that forms a surface different from the rake face of the corner R edge. A gash is formed between the rake face of the end cutting edge and a flank of an end cutting edge that is adjacent on a forward side thereof in the rotation direction R.

14 Claims, 23 Drawing Sheets

(52) U.S. Cl.
CPC .. *B23C 2210/082* (2013.01); *B23C 2210/208* (2013.01); *B23C 2210/209* (2013.01); *B23C 2210/32* (2013.01); *B23C 2210/40* (2013.01); *B23C 2215/44* (2013.01); *Y10T 407/1948* (2015.01)

(56) References Cited

U.S. PATENT DOCUMENTS

| | | | | | |
|---|---|---|---|---|---|
| 5,322,394 | A | * | 6/1994 | Okanishi | B23C 5/10 407/32 |
| 5,467,670 | A | * | 11/1995 | Alverio | B23C 5/10 76/104.1 |
| 6,007,276 | A | * | 12/1999 | Wardell | B23C 5/10 407/54 |
| 6,168,355 | B1 | * | 1/2001 | Wardell | B23C 5/10 407/54 |
| 6,435,780 | B1 | * | 8/2002 | Flynn | B23C 5/10 407/53 |
| 6,439,811 | B1 | * | 8/2002 | Wardell | B23C 5/10 407/54 |
| 6,517,017 | B1 | * | 2/2003 | Bellasalma | B23C 5/1009 241/140 |
| 7,207,755 | B2 | * | 4/2007 | Berglow | B23C 5/10 407/11 |
| 7,513,724 | B2 | * | 4/2009 | Kakai | B23B 31/11 279/8 |
| 7,699,565 | B2 | * | 4/2010 | Aoki | B23C 5/10 407/53 |
| 8,858,128 | B2 | * | 10/2014 | Budda | B23C 5/1009 407/53 |
| 2003/0180104 | A1 | * | 9/2003 | Kuroda | B23C 5/10 407/54 |
| 2007/0056424 | A2 | * | 3/2007 | Tanaka | B23C 5/10 83/663 |
| 2007/0217874 | A1 | * | 9/2007 | Meece | B23C 5/10 407/54 |
| 2007/0286691 | A1 | * | 12/2007 | Glimpel | B23C 5/10 407/54 |
| 2011/0033251 | A1 | * | 2/2011 | Davis | B23C 5/10 407/114 |
| 2012/0039677 | A1 | * | 2/2012 | Davis | B23C 5/10 407/54 |
| 2013/0259585 | A1 | * | 10/2013 | Xu | B23C 5/10 407/54 |
| 2014/0294528 | A1 | * | 10/2014 | Azegami | B23C 5/10 408/200 |
| 2014/0341662 | A1 | * | 11/2014 | Yamayose | B23C 5/10 407/54 |

FOREIGN PATENT DOCUMENTS

| | | | | |
|---|---|---|---|---|
| EP | 1 908 543 A1 | 4/2008 | | |
| GB | 2364007 | 1/2002 | | |
| JP | 02185312 A | * | 7/1990 | B23D 79/04 |
| JP | 04354611 A | * | 12/1992 | B23C 5/10 |
| JP | 06126521 A | * | 5/1994 | B23C 5/10 |
| JP | 2001225218 A | * | 8/2001 | B23C 5/10 |
| JP | 2002-36020 | 2/2002 | | |
| JP | 2003-159610 | 6/2003 | | |
| JP | 2003165015 A | * | 6/2003 | B23C 5/10 |
| JP | 2005-246492 | 9/2005 | | |
| JP | 2006-26853 | 2/2006 | | |
| JP | 2007-30074 | 2/2007 | | |
| JP | 2008-110472 | 5/2008 | | |
| JP | 2008-264964 | 11/2008 | | |
| JP | 2009-226509 | 10/2009 | | |
| JP | 2009-226562 | 10/2009 | | |
| JP | 2010-167520 | 8/2010 | | |
| JP | WO 2011149062 A1 | * | 12/2011 | B23C 5/10 |
| SE | WO 9408745 A1 | * | 4/1994 | B23C 5/006 |
| SE | EP 1629918 A1 | * | 3/2006 | B23C 5/10 |
| SE | WO 2006033616 A1 | * | 3/2006 | B23B 31/1107 |
| SE | WO 2006033617 A1 | * | 3/2006 | B23B 31/11 |
| WO | WO 2010/084805 A1 | 7/2010 | | |
| WO | WO 2010/104453 | 9/2010 | | |

OTHER PUBLICATIONS

"Technicut/Optimised Tooling Solutions," url: http://www.technicut.ltd.uk/aerospace-aeroengine.html, 2008, retrieved Dec. 11, 2013.

Extended European Search Report dated Dec. 22, 2014 in corresponding European Patent Application No. 11867770.7.

Office Action dated Mar. 13, 2012 in corresponding Japanese Patent Application No. 2012-502783.

* cited by examiner

F I G . 3
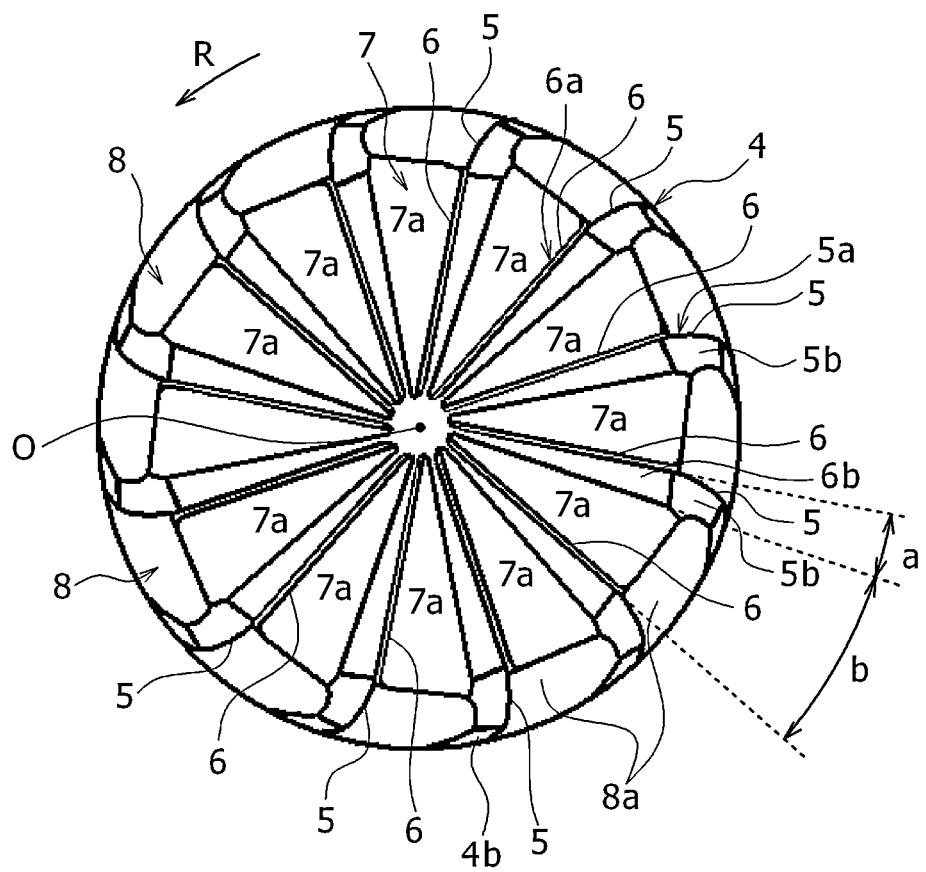

MULTI-FLUTE ENDMILL

CROSS-REFERENCE TO RELATED APPLICATIONS

This application is a U.S. national stage application of PCT/JP2011/080208 filed Dec. 27, 2011 and claims foreign priority benefit of Japanese Application No. 2011-134685 filed Jun. 17, 2011 in the Japanese Intellectual Property Office, the contents of both of which are incorporated herein by reference.

BACKGROUND

Technical Field

The present invention is related to a multi-flute endmill provided with multiple cutting edges that is mounted to a 3-axis or 5-axis controlled machine tool used to perform cutting work when manufacturing a thin-walled impeller or blade used in rotating equipment such as a turbine or supercharger, the multi-flute endmill being improved so that high-feed processing can be performed on the raw material of the impeller or the like.

A thin-walled impeller, blade, or the like used in rotating equipment such as a turbine or supercharger is manufactured, for example, as follows: an alloy raw material that is difficult to cut (difficult-to-cut material) made of a nickel-based heat-resistant alloy such as Inconel (registered trademark) 718, stainless steel, or titanium alloy is fixed onto the rotation shaft of a machine tool, and then the difficult-to-cut material is subjected in this state to multiple cutting processes such as rough processing, semi-finishing processing, and finishing processing by performing multi-axis control of a cutting tool such as an endmill while rotating the cutting tool.

In finishing processing, since it is necessary to finish a difficult-to-cut material to have a curved surface in which the material surface of the difficult-to-cut material is curved, a ball endmill, a tapered ball endmill, or a radius endmill provided with an edge part consisting of an outer peripheral edge, a corner edge, and an end cutting edge is conventionally used. Further, in recent years, a multi-edge radius endmill provided with multiple edge parts (hereinafter also referred to as a "multi-flute endmill") has gradually begun to be used.

In the following explanation, a thin-walled curved member such as an impeller, a blade, and a vane that is thin-walled and has a curved surface and is a material to be cut by the multi-flute endmill of the present invention (a material to be cut) will be uniformly referred to by the name "impeller".

With regard to prior art in which a tapered ball endmill or a radius endmill or the like is mounted on a machine tool to perform cutting of an impeller, Patent Document 1 proposes an invention of a cutting method using a tool (tapered ball endmill) that machines a large impeller with good precision without causing chipping in a thin blade part. Paragraph [0013] of Patent Document 1 discloses cutting the blade part by fixing an impeller raw material onto a rotation shaft, controlling a rotating tapered ball endmill at three axes, and numerically controlling the rotating tapered ball endmill along the surface of the blade parts. However, there is no ingenuity for processing applied to the tool itself.

Patent Document 2 proposes an invention related to a device and method for machining a three-dimensional curved surface, in which machining with good precision is carried out by performing grinding based on the cutting surface after performing cutting on an object to be machined such as a runner vane of a hydraulic turbine generator having a complex three-dimensional curved surface. However, this invention is not an invention of a tool (ball endmill) itself.

On the other hand, with regard to prior art related to multi-flute endmills, for example, Patent Document 3 proposes a related idea. As shown in FIGS. 2, 4, and 8, in the multi-flute endmill of Patent Document 3, the outer peripheral edges of the multiple cutting edges (the number of edges is 16 in FIG. 4) are inclined in the axial direction of the tool, and flutes for discharging chips are inclined from the forward side to the rearward side in the rotation direction from the tip to the middle of the tool in the axial direction.

Patent Document 4 proposes an invention of a radius endmill suitable for heavy cutting such as groove cutting. The radius endmill shown in FIGS. 7 and 8 of Patent Document 4 has helical peripheral cutting edges at the outer periphery and circular edges (corner R edges) at the outer periphery side of end cutting edges, and the discharge of chips is improved by the shape of the flute face in the cross-section perpendicular to the helical peripheral cutting edges because a curve from the rake face through the bottom, the back flank, and up to the tertiary relief flank of the adjacent peripheral cutting edge forms an approximate U shape. Further, the rake face of the circular edge is formed as a continuous convex surface along the cutting edge of the circular edge from the end of the peripheral cutting edge to the end of the end cutting edge, and thereby the radius endmill is strengthened against damage.

Patent Document 5 proposes an endmill provided with multiple cutting edges formed in a normal shape of an involute (or involute of circle) at the tip of the tool main body. In the multi-flute endmill of Patent Document 5, in order to improve the discharge of chips, the multiple cutting edges are inclined to the rearward side in the rotation direction from the center toward the outer periphery from the outer periphery part toward the rotation center direction of the endmill at the tip of the tool main body. The multiple cutting edges are formed to be oriented at an α with the radial direction of the tool main body so as to contact an outer peripheral wall of a supply hole that supplies a coolant (or lubricant) liquid. Also, a radial clearance surface (39) and a chip room (45), which form indentations for improving the discharge of chips, are provided between adjacent cutting edges (refer to FIG. 2).

Patent Document 6 proposes an endmill (a multi-fluted milling cutter) in which multiple cutting edges (cutting teeth) are formed toward the rotation center direction on the tip of the tool main body and formed helically on the outer periphery continuing up to the tip. It is disclosed that in the multi-flute endmill, the number of cutting edges is at least 20 (refer to FIG. 2).

Non-Patent Document 1, which is a WEB page, discloses information related to a multi-flute endmill (milling cutter) for cutting a material for airplanes such as a titanium alloy, which is a difficult-to-cut material, with high efficiency. As described on this WEB page, in the multi-flute endmill, multiple cutting edges are formed on the tip of the tool main body and on the outer peripheral surface continuing up to the tip.

PRIOR ART DOCUMENTS

Patent Documents

1. JP 2002-36020 A
2. JP 2009-226562 A

3. DE 20 2009 013 808 U1
4. JP 2003-159610 A
5. WO 2010/104453 (A1)
6. GB 2364007 (A)

Non-Patent Documents

1. Technicut Web Page: Technicut/Optimised Tooling Solutions, 2008 (http://www.technicut.ltd.uk/aerospace-aeroengine.html)

SUMMARY

Problems to be Solved

In Patent Documents 1 and 2, it is disclosed that a ball endmill is used as the tool for cutting the impeller. However, the number of cutting edges of a ball endmill is generally set to "2 to 4", and thus high-feed processing which is an object of the present invention cannot be realized.

The multi-edge radius endmill disclosed in Patent Document 3 is related to a technology for improving the arrangement and orientation of a plurality of coolant holes provided on the tip of the tool main body in order to cut a curved surface of an impeller. FIGS. 4 and 8 of Patent Document 3 illustrate that in the plurality of end cutting edges, grooves are formed between adjacent end cutting edges to discharge chips to the outside. However, Patent Document 3 does not specifically disclose anything regarding the structures of the end cutting edges, corner R edges, peripheral cutting edges, the rake faces and flanks of these cutting edges, and the chip pocket of the radius endmill in order to carry out high-feed processing and improve the discharge of chips.

In the radius endmill disclosed in Patent Document 4, the flute faces are formed in a recessed curved fashion in order to improve the discharge of chips by the end cutting edges when cutting grooves. However, this endmill is not for improving the discharge of chips when cutting using corner R edges.

Further, the only case disclosed in Patent Document 4 is that in which the number of cutting edges of the radius endmill is 4, and there are no disclosures regarding how the cutting edges would be constituted if the number of cutting edges was increased to 6 or more to carry out high-feed cutting. In addition, in the endmill disclosed in Patent Document 4, in FIG. 2, from the rake face 4, the bottom 5, and the back flank 6 up to the tertiary relief face 7 of the adjacent cutting edge is smoothly ground into a U-shaped recessed curved surface. However, as will be explained later, the structure of this recessed curved surface portion is different from the endmill of the present invention because it corresponds to the flute 8 and flute face 8a in the endmill of the present invention. In other words, the recessed curved surface portion in the endmill disclosed in Patent Document 4 is not the gash 7 and the gash face 7a that constitute a space shaped in a V or the like as in the endmill of the present invention, and thus it is structurally different from the endmill of the present invention. Accordingly, the endmill of Patent Document 4 cannot realize high-feed processing which is an object of the present invention.

Patent Document 5 discloses that in order to improve the discharge of chips, the multiple cutting edges (end cutting edges) are formed radially from the outer periphery part toward the rotation center direction of the endmill at the tip of the tool main body, and indentations (a radial clearance surface (39) and a chip room (45)) are provided between adjacent cutting edges. However, Patent Document 5 does not concretely describe the specific constitution of the indentations, such as the structures of the end cutting edges, corner R edges, peripheral cutting edges, the rake faces and flanks of these cutting edges, and the chip pocket in order to perform high-feed processing.

Patent Document 6 discloses an endmill in which multiple cutting edges (at least 20 or more) are formed on the tip of the tool main body and the outer periphery continuing up to the tip. However, Patent Document 6 does not describe anything regarding the concrete structures of the end cutting edges, corner R edges, peripheral cutting edges, the rake faces and flanks of these cutting edges, and the chip pocket in order to perform high-feed processing.

Non-Patent Document 1 discloses pictures of a multi-flute endmill for cutting a material for airplanes such as a titanium alloy, which is a difficult-to-cut material, with high efficiency. However, Non-Patent Document 1 does not disclose anything regarding the concrete structures of the end cutting edges, corner R edges, peripheral cutting edges, the rake faces and flanks of these cutting edges, and the chip pocket that constitute each of the multiple cutting edges.

Therefore, the present invention was created to solve the above-described problems of the prior art, and an object of the present invention is to provide a multi-flute endmill that can yield high precision cutting surfaces even when performing high-feed cutting and can remarkably improve the discharge of chips to realize high efficiency processing. In particular, an object of the present invention is to provide a multi-flute endmill that can perform high-feed finishing cutting at an axial direction cutting depth of, for example, 1 mm or more using a 3-axis or 5-axis NC machine tool on the surface of an impeller having a curved surface that is made of a thin-walled member of an alloy raw material that is difficult to cut such as a nickel-based super-heat-resistant alloy, and can achieve good discharge of chips that are generated even when performing such high-feed cutting.

The "multi-flute endmill" mentioned above refers to a radius endmill in which the number of cutting edges is 6 or more when a single of cutting edge unit (one cutting edge) consists of a peripheral cutting edge formed on a peripheral surface of the tool main body, a corner R edge formed continuously with one end of the peripheral cutting edge on an end peripheral part of the tool main body, and an end cutting edge formed continuously with the other end of the corner R edge in the tool axial direction at an end face (tip) part of the tool main body.

Means for Solving the Problem

In order to solve the above-described problem, the multi-flute endmill according to a first aspect of the invention includes a cutting edge part having multiple cutting edges, each consisting of an end cutting edge formed on a tip side of a shank from a tool axis side to an outer peripheral side in the radial direction of the shank, a corner R edge that is continuous with the end cutting edge, and a peripheral cutting edge that is continuous with the corner R edge; and flutes formed between adjacent cutting edges in a rotation direction around the tool axis, the multi-flute endmill being characterized in that a rake face of the cutting edge is formed from a rake face of the end cutting edge from the tool axis side to the outer peripheral side of the shank, a rake face of the corner R edge that is adjacent to the rake face of the end cutting edge and forms a surface different from the rake face of the end cutting edge, and a rake face of the peripheral cutting edge that is adjacent to the rake face of the corner R edge and forms a surface different from the rake face of the corner R edge, the rake face of the peripheral cutting edge is adjacent to the rake face of the corner R edge at an end on the corner R edge side and also serves as one flute face that constitutes the flute, and the rake face of the corner R edge is adjacent to the rake face of the end cutting edge at an end on the tool axis side, and a gash that forms a space that is continuous with the flute is formed between the rake face of the end cutting edge and a flank of an end cutting edge that is adjacent on a forward side thereof in the rotation direction, and the rake face of the end cutting edge also serves as one surface that constitutes the gash.

In addition, as shown in FIG. 17 which schematically illustrates the formation of the gash and flute in the shank, the rake face of the end cutting edge and the gash face that opposes the rake face on the forward side in the rotation direction which constitute the gash create intersecting surfaces (including a flat surface and a curved surface) that pass through the tool axis O in a cross-section S1 that is orthogonal to the tool axis, respectively include different intersecting straight lines AB and AE in the radial direction, and mutually form an angle φ in the rotation direction on the tool axis, and at least the gash face intersects the rake face (face including AEFD) of the end cutting edge in a state in which the gash face forms a surface (including a twisted surface) ABC' D' that is inclined toward the rearward side in the rotation direction from the tip to a middle of the shank relative to a flat surface ABCD including the one straight line AB in the radial direction that passes through the tool axis O. Thereby, the rake face of the end cutting edge and the gash face that constitute the gash 7 intersect each other.

Further, the present invention is characterized in that the flute is formed from the rake face of the peripheral cutting edge that also serves as one flute face and a flute face that opposes the rake face of the peripheral cutting edge on the forward side in the rotation direction, and the flute face that opposes the rake face of the peripheral cutting edge is inclined relative to the gash face toward the forward side in the rotation direction from the inner peripheral side in the radial direction to the outer peripheral side in the radial direction of the cutting edge part and inclined toward the rearward side in the rotation direction from the tip to the middle of the cutting edge part.

In other words, the flute is formed from the rake face of the peripheral cutting edge that also serves as one flute face and a flute face that opposes the rake face of the peripheral cutting edge on the forward side in the rotation direction, and the flute face forms a surface (GIKL) that is inclined such that its outer peripheral side or inner peripheral side in the radial direction creates an inclination angle ξ to the rearward side in the rotation direction relative to the gash face that forms the inclined surface ABC'D' including the one straight line AB in the radial direction that passes through the tool axis. Thereby, an effect is enabled in which chips that are fed (discharged) from the gash 7 to the flute 8 are turned around to the rearward side in the rotation direction R within the flute 8.

In accordance with a second aspect of the invention, if the rake face 4a of the peripheral cutting edge that also serves as one flute face of the flute face 8a forms a surface (GMNH) that is inclined such that its outer peripheral side or inner peripheral side in the radial direction creates an inclination angle η to the rearward side in the rotation direction R relative to the rake face 6a (surface including AEFD) of the end cutting edge, the rake face 4a (GMNH) of the peripheral cutting edge forms a surface from a point G located more toward the tool axis O side than the outer peripheral surface of the shank 2 up to a point M on the outer peripheral side from the forward side toward the rearward side in the rotation direction R. Therefore, an effect is enabled in which chips are turned around to the rearward side in the rotation direction R within the flute 8 so as to improve the discharge of chips.

In accordance with a third and fourth aspec of the invention the first and second aspects of the invention are characterized in that the gash is formed in a fan shape that has a central angle when viewing the shank in the tool axis O direction.

In accordance with further aspects of the invention, the multi-flute endmill according to the first through third aspects of the invention are characterized in that the sum of the volumes of the flute and the gash (volume of a chip pocket) is in the range of 25 mm3 to 120 mm3 when an edge diameter of the multi-flute endmill at a starting point of formation of the peripheral cutting edges is 10 mm to 30 mm and a number of cutting edges is 6 to 30.

In acordance with still further aspects of the invention, the multi-flute endmill according to the first through third aspects of the invention are, characterized in that, as shown in FIG. 2, the peripheral cutting edge is formed to create an inclination (downward inclination) toward the rearward side in the rotation direction from the tip to the middle of the multi-flute endmill in the tool axis direction of the shank and is continuous with the corner R edge, and an inclination angle α relative to the tool axis of the inclination is set to a range of from 5° or more to 10° or less.

In accordance with still further aspects of the invention, the multi-flute endmill according to the first through third aspects are characterized in that when the edge diameter of the multi-flute endmill at the starting point of formation of the peripheral cutting edges is 10 mm to 30 mm and the number of cutting edges is 6 to 30, the sum of the volumes of the flute and the gash is in the range of 25 $mm^3$ to 120 $mm^3$, the peripheral cutting edge is formed to create an inclination toward the rearward side in the rotation direction from the tip to the middle of the multi-flute endmill in the tool axis direction of the shank and is continuous with the corner R edge, and an inclination angle α relative to the tool axis of the inclination is set to a range of from 5° or more to 10° or less.

In the multi-flute endmill according to anyone of claims the above aspects of the invention, as shown in FIG. 4, it is appropriate to set a gash angle β created by a groove of the gash formed between the rake face of the end cutting edge and the flank of an end cutting edge that is adjacent on a forward side thereof in the rotation direction and a cross-section that is orthogonal to the tool axis to a range of from 15° or more to 45° or less. The "groove of the gash" is a groove (intersection line) formed when the two surfaces (the rake face 6a of the end cutting edge and the gash face 7a shown in FIG. 2) that constitute the gash 7 as described above intersect each other at the middle in the axial direction of the shank 2, and this groove has an inclination (gash angle β) from the tip toward the middle in the axial direction of the shank 2 from the center to the outer periphery of the shank 2.

As shown in FIG. 3, when viewing the cutting edge part from the tip of the multi-flute endmill in the tool axis direction, an angle created by the end cutting edge and a ridge line on the rearward side in the rotation direction of the shank at the flank of the end cutting edge is a width angle a of the flank of the end cutting edge, and an angle created by the ridge line on the rearward side in the rotation direction of the shank at the flank of the end cutting edge and an end cutting edge that is adjacent thereto on the rearward side in the rotation direction is a gash opening angle b. In this case, it is appropriate to arrange the end cutting edges such that the angle b is in a range of from 1.5 times or more to 3 times or less of the angle a.

As shown in FIG. 5, it is appropriate to set a rake angle of a cross-section perpendicular to the axis at a connecting part of the peripheral cutting edge and the corner R edge to a range of from 3° or more to 10° or less. As shown in FIGS. 6 to 8, it is appropriate to set a flank angle at a cross-section in a direction that is orthogonal to each tangent line of the end cutting edge, the corner R edge, and the peripheral cutting edge to be constant for each end cutting edge, corner R edge, and peripheral cutting edge.

As shown in FIG. 2, it is appropriate to set an edge length of the cutting edges formed in the cutting edge part to a range of from 30% or more to 60% or less of the edge diameter of the multi-flute endmill at the starting point of formation of the peripheral cutting edges. As shown in FIG. 4, it is appropriate to set a curvature radius of an R-shaped part of the corner R edge to a range of from 10% or more to 20% or less of the edge diameter of the multi-flute endmill at the starting point of formation of the peripheral cutting edges.

In the multi-flute endmill of the present invention, it is appropriate to coat an AlCr-based hard coating on at least the surface of the cutting edge part, and preferably on the entire surface of the multi-flute endmill, or on the entire surface of the endmill including the cutting edge part.

Effects of the Invention

Between the rake face of the end cutting edge and the rake face of the peripheral cutting edge that constitute the rake face of the cutting edge, a rake face of a corner R edge that is adjacent to both the rake faces of the end cutting edge and the peripheral cutting edge and forms a surface different from these rake faces is provided. Thereby, the rake face of the corner R edge achieves an effect of serving as an introducing portion that alleviates the level difference between the rake face of the end cutting edge that constitutes the gash and the rake face of the peripheral cutting edge that constitutes the flute and guides the discharge of chips that have entered the gash to the flute.

The rake face of the corner R edge alleviates the level difference between the rake face of the peripheral cutting edge and the flank of the corner R edge, and thereby the capacity (volume) of the space of the flute constituted by the rake face of the peripheral cutting edge is increased and thus congestion (build up) of chips does not easily occur within the flute. As a result, an action of facilitating the effect of discharging the chips from the gash to the flute is achieved, and thus the discharge of the chips that are generated during cutting can be improved.

In the present invention, if the rake face of the end cutting edge and the gash face that opposes the rake face on the forward side in the rotation direction which constitute the gash are formed to intersect each other, the gash space can be formed largely without losing any rigidity. Thereby, the discharge of chips from the gash to the flute can be further improved, and high-feed processing that is highly precise and stable can be performed over a long lifetime on a material to be cut that is an alloy material that is difficult to cut even when performing high-feed cutting at a cutting depth that is deeper than in conventional cutting.

BRIEF EXPLANATION OF THE DRAWINGS

FIG. 3 is an end surface view showing the state of the cutting edge part of the multi-flute endmill shown in FIG. 2 when viewed from the end surface side in the tool axis direction;

DESCRIPTION OF EMBODIMENTS

Figure 1:
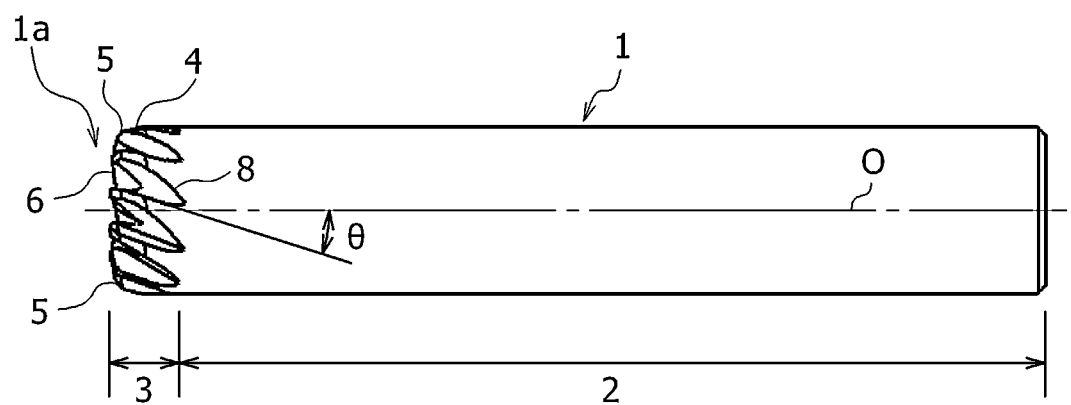
FIG. 1 is a side surface view showing one embodiment of the multi-flute endmill of the present invention.

Conventionally, for example, when performing high-feed cutting using a 3-axis or 5-axis NC machine tool on the surface of an alloy raw material that is difficult to cut of an impeller formed from a curved surface, it was difficult to discharge chips generated in an extremely short amount of time from the start of cutting, and thus high-feed processing was not possible. In order to overcome this problem, in the present invention, focusing on the structure of a cutting edge part 3 of a radius endmill, a novel and innovative structure is used for the cutting edge part 3 in order to improve the discharge of chips. In detail, by improving the shapes of the cutting edges formed from an end cutting edge 6, a corner R edge 5, and a peripheral cutting edge 4 that constitute the cutting edge part 3, it is possible to secure a large volume for a chip pocket CP per one cutting edge formed from a space of a gash 7 and a flute 8 that are formed between adjacent cutting edges, and thus high-feed processing which was conventionally difficult can be realized.

Although not particularly limited, when using, for example, a nickel-based heat-resistant alloy raw material as the material to be cut, "high-feed processing" generally refers to processing in which the cutting speed Vc is preferably 60 to 80 mm/min. If the cutting speed Vc is less than 60 mm/min, the cutting performance decreases, and thus the cutting resistance becomes excessive. If the cutting speed Vc exceeds 80 mm/min, the cutting temperature becomes extremely high, and thus acceleration of wear and welding of the endmill 1 occurs. Further, since the abrasion between the material to be cut and the endmill becomes excessive, the wear on the flanks becomes particularly great. Given the above, when the material to be cut is, for example, a nickel-based heat-resistant alloy raw material, the cutting speed Vc is more preferably in the range from 65 to 80 mm/min, and even more preferably in the range from 70 to 80 mm/min.

Although not particularly limited, when the material to be cut is, for example, a nickel-based heat-resistant alloy raw material, "high-feed processing" generally refers to processing in which the feed rate Vf is preferably 1000 to 3000 mm/min. If the feed rate Vf is less than 1000 mm/min, the efficiency decreases. On the other hand, if the feed rate Vf exceeds 3000 mm/min, the amount of chips generated becomes excessive, and thus chip clogging easily occurs. The feed rate Vf is more preferably in the range from 1500 to 3000 mm/min, and even more preferably in the range from 1800 to 3000 mm/min.

The substantial cutting efficiency that can be realized per one cutting edge is determined by a feed amount fz [mm/t] per one cutting edge, a radial direction cutting depth ae [mm], and an axial direction cutting depth ap [mm], which are derived from the feed rate, number of rotations, and number of cutting edges. In a conventional multi-flute endmill, a practical cutting life (the life necessary to complete the finishing processing of an impeller without changing the tool) can only be secured at an efficiency of a feed amount fz per one cutting edge of 0.03 to 0.06 mm/t, a radial direction cutting depth ae of 0.4 to 0.6 mm, and an axial direction cutting depth ap of 0.4 to 0.6 mm. However, in the multi-flute endmill of the present invention, it is possible to perform cutting under cutting conditions of extremely high efficiency such as a feed amount fz per one cutting edge of 0.08 to 0.3 mm/t, a radial direction cutting depth ae of 1 to 10 mm, and an axial direction cutting depth ap of 0.8 to 2.0 mm. Therefore, one great advantage when using the present invention is that a practical cutting life can be secured even under cutting conditions of extremely high efficiency as described above.

As explained above, the main constitutional features of the multi-flute endmill 1 of the present invention for performing high-feed, high-efficiency cutting are the following Feature 1 and Feature 2:

(Feature 1): The rake face of each cutting edge is constituted from a rake face 6a of an end cutting edge 6, a rake face 5a of a corner R edge that is continuous with the rake face 6a, and a rake face 4a of a peripheral cutting edge that is continuous with the rake face 5a.

(Feature 2): A gash 7 that forms a space that is continuous with a flute 8 is formed between the rake face 6a of the end cutting edge 6 and a flank 6b of an end cutting edge 6 that is adjacent on a forward side thereof in the rotation direction.

Due to Features 1 and 2, chips which are mainly generated by the corner R edges 5 used during cutting can be easily discharged to the outside via the gashes 7 formed between adjacent cutting edges and the flutes 8 that are in communication with the gashes 7. Therefore, chip clogging can be prevented even when performing high-feed cutting, and as a result damage to the cutting edges can also be prevented.

Embodiments of the multi-flute endmill 1 of the present invention will be explained in detail below using the drawings.

Figure 2:
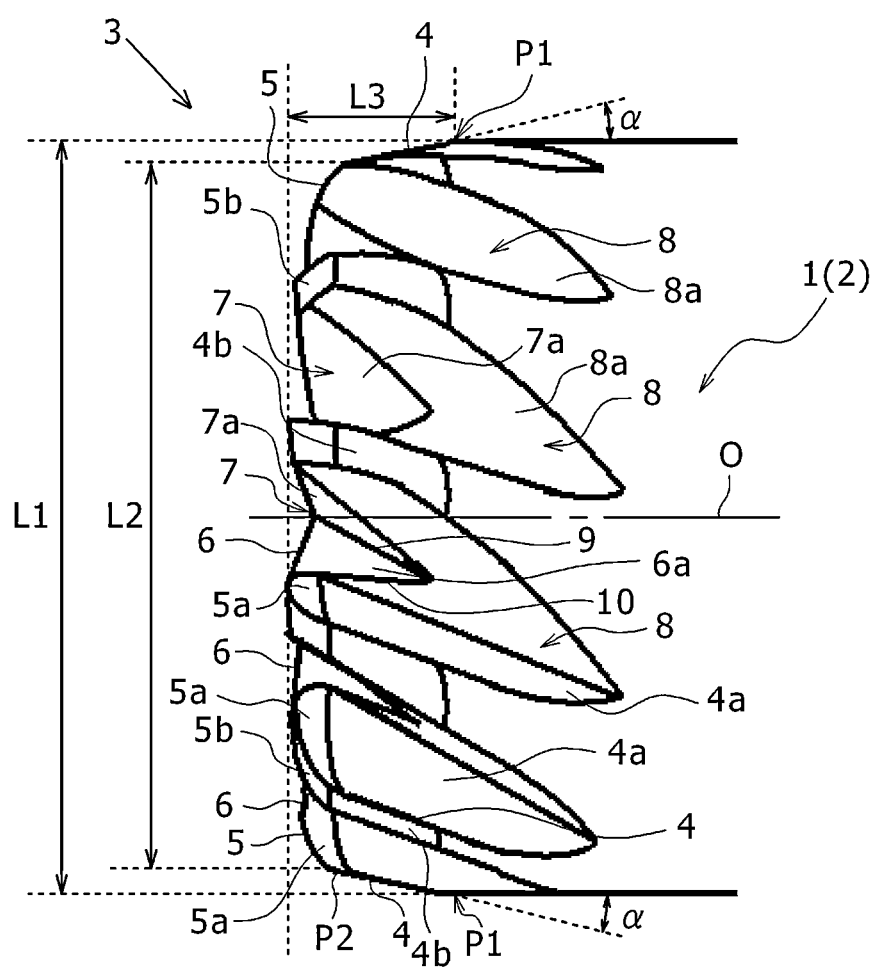
FIG. 2 is a partially enlarged view of a cutting edge part of the multi-flute endmill shown in FIG. 1.

FIGS. 1 to 3 are for explaining the constitution of the multi-flute endmill 1, which represents one embodiment of the present invention. FIG. 1 is a side surface view showing one embodiment of the multi-flute endmill 1 of the present invention. FIG. 2 is a partially enlarged view of a cutting edge part 3 of the multi-flute endmill 1 shown in FIG. 1. FIG. 3 is an end surface view showing the state of the cutting edge part 3 of the multi-flute endmill 1 shown in FIG. 2 when viewed from the end surface side in a tool axis O direction.

As shown in FIG. 1, the multi-flute endmill 1 which represents one embodiment of the present invention includes a cylindrical shank 2 that has a predetermined length in the tool axis (rotation center axis) O direction, and a cutting edge part 3 formed at one end (on the side of a tip 1a of the multi-flute endmill) of the shank 2. As shown in FIG. 2, in the cutting edge part 3, multiple cutting edges are formed in which a cutting edge consisting of the following is one unit (one cutting edge): a peripheral cutting edge 4, a corner R edge 5 formed in an approximate arc shape or convex curve shape (R shape) which is continuous with one end of the peripheral cutting edge 4 on the tip 1a side of the multi-flute endmill, and an end cutting edge 6 that is continuous with the other end of the corner R edge 5. In the present invention, the tip 1a of the multi-flute endmill 1 indicates a tip at which the cutting edge part 3 is provided of the multi-flute endmill 1 of the present invention.

The corner R edge 5 is disposed as a cutting edge that forms an R shape (round shape) (a curved line shape or a curved surface shape) at its peripheral part on the tip 1a side. The end cutting edge 6 is continuous with the other end of the corner R edge 5, and is formed in a straight line shape up to the vicinity of the tool axis O. Therefore, the multi-flute endmill 1 can be regarded as a type of radius endmill. In the multi-flute endmill 1 of the present invention, the end on the side opposing the tip 1a side is a portion that is retained by the machine tool.

Figure 4:
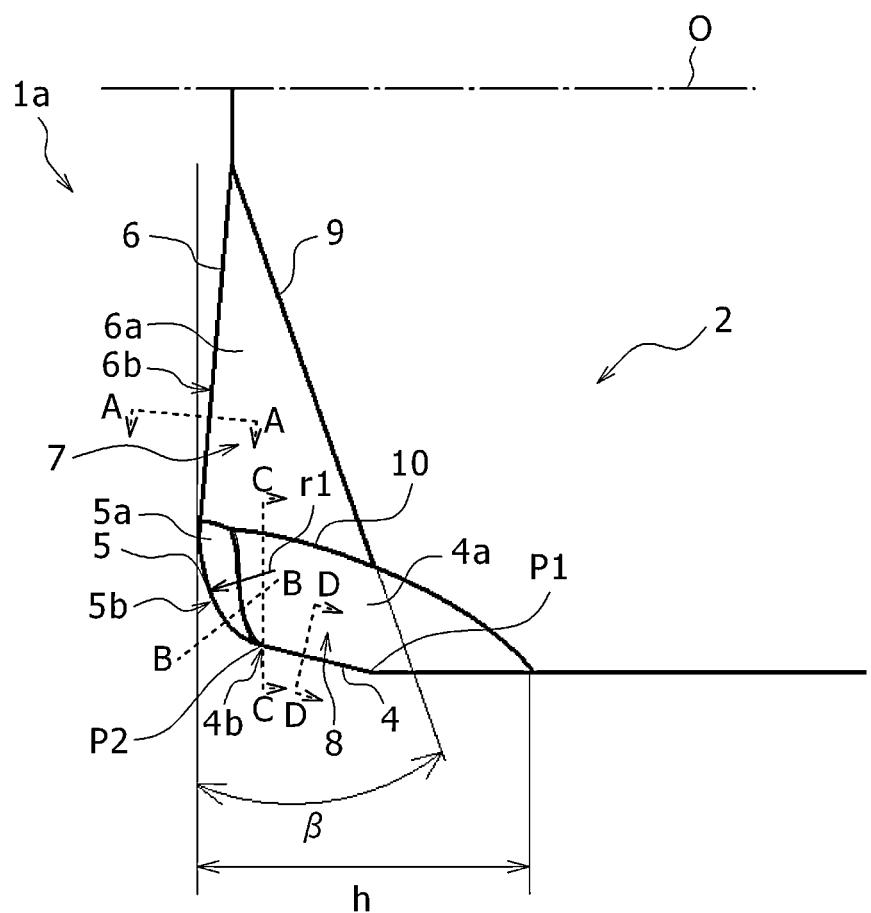
FIG. 4 is a cross-section view illustrating a relationship between an end cutting edge, a corner R edge, and a peripheral cutting edge that constitute one cutting edge formed in the cutting edge part of the multi-flute endmill shown in FIG. 2.

FIG. 4 is a cross-section view showing the relationship between the end cutting edge 6, the corner R edge 5, and the peripheral cutting edge 4 that constitute a single cutting edge formed in the cutting edge part 3 of the multi-flute endmill 1 shown in FIG. 2. The rake face of each cutting edge in the multi-flute endmill 1 of the present invention is constituted from a rake face 6a of the end cutting edge 6 from the tool axis O side to the outer periphery of the shank 2, a rake face 5a of the corner R edge that is adjacent to the rake face 6a of the end cutting edge 6 and forms a surface different from the rake face 6a of the end cutting edge 6, and a rake face 4a of the peripheral cutting edge 4 that is adjacent to the rake face 5a of the corner R edge 5 and forms a surface that is different from the rake face 5a of the corner R edge 5.

Figure 11:
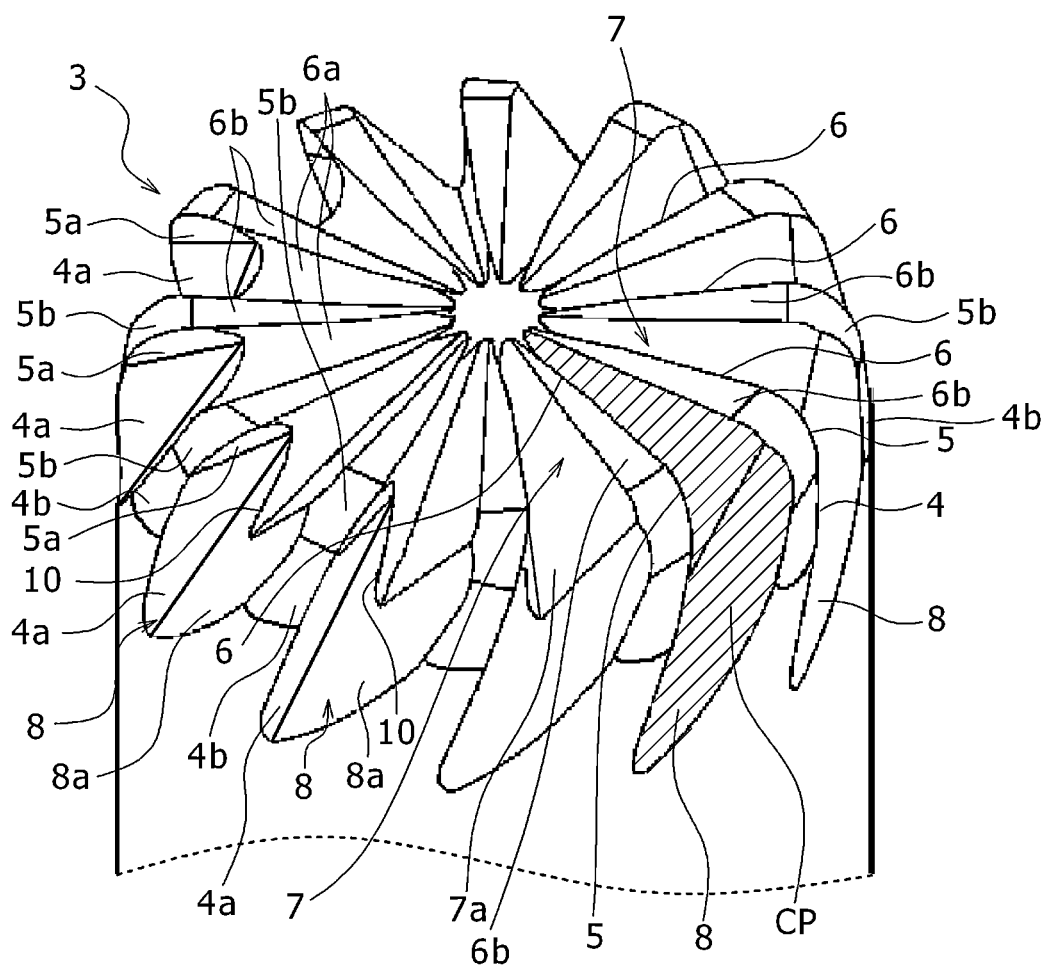
FIG. 11 is a perspective view showing the state of the cutting edge part of the multi-flute endmill of the present invention when viewed from the tip side to the shank side.

FIG. 11 is a perspective view showing the state of the cutting edge part 3 of the multi-flute endmill 1 of the present invention when viewed from the tip 1a side to the shank 2 side. As shown in FIGS. 4 and 11, the rake face 4a of the peripheral cutting edge 4 is adjacent to the rake face 5a of the corner R edge 5 at an end on the corner R edge 5 side and also serves as one flute face that constitutes the flute 8. The rake face 5a of the corner R edge 5 is adjacent to the rake face 6a of the end cutting edge 6 at an end on the tool axis O side. The gash 7 that is continuous with the flute 8 is formed between the rake face 6a of the end cutting edge 6 and a flank 6b of an end cutting edge 6 that is adjacent on a forward side thereof in a rotation direction R, and the rake face 6a of the end cutting edge 6 also serves as one surface that constitutes the gash 7. As shown in FIG. 11, when the cutting edge is viewed in the rotation direction R (circumferential direction around the shank 2), the rake face 5a of the corner R edge 5 is positioned between the rake face 4a of the peripheral cutting edge 4 and a flank 5b of the corner R edge 5. The flute 8 is formed from the rake face 4a of the peripheral cutting edge 4 and a flute face 8a that opposes the rake face 4a on the forward side in the rotation direction R.

Next, the constitution of the cutting edge part 3 will be explained below in detail based on FIGS. 2 and 3. The peripheral cutting edge 4 is formed so as to be inclined downward from a point P1 (refer to FIG. 2), which is an edge on the tip 1a side of the multi-flute endmill 1 and on the shank 2 side of the peripheral cutting edge 4, in a direction toward the tip 1a side of the multi-flute endmill 1 to form an angle $\alpha$ (refer to FIG. 2) relative to the tool axis O (so that an angle formed by the tangent line of the peripheral cutting edge 4 that passes through the point P1 and the tool axis O is $\alpha$). The point P1 is a starting point of formation (hereinafter referred to as a "formation starting point") at which the peripheral cutting edge 4 is formed from an outer peripheral surface of the multi-flute endmill 1 (shank 2) in a direction toward the tip 1a side. In the explanation below, the point P1 will be called the "peripheral cutting edge formation starting point P1".

As shown in FIG. 2, the peripheral cutting edge 4 that is inclined downward from the peripheral cutting edge formation starting point P1 at the inclination angle $\alpha$ is continuous with the corner R edge 5 at a point P2 which is an end thereof (an end of the tangent line of the peripheral cutting edge 4 that passes through the point P1). Therefore, the point P2 is a connecting point that connects the peripheral cutting edge 4 and the corner R edge 5 (in the explanation below, the point P2 will be called the connecting part P2 between the peripheral cutting edge and the corner R edge). When the multi-flute endmill 1 is viewed from the circumferential direction, as shown in FIG. 4, the corner R edge 5 is formed in an R shape or a convex curve that has a predetermined curvature radius (curvature radius r1 of the R-shaped portion of the corner R edge 5) from the connecting part P2 between the peripheral cutting edge and the corner R edge toward the direction of the tip 1a side.

A ridge line that forms the cutting edge of the peripheral cutting edge 4 is formed in a straight line shape or a convex shape as shown in FIG. 2, is inclined to form an inclination angle $\alpha$ relative to the tool axis O, and is continuous with the corner R edge 5 at the connecting part P2 between the peripheral cutting edge 4 and the corner R edge 5. Further, the peripheral cutting edge 4 is twisted at a helix angle $\theta$ of, for example, 20° relative to the tool axis O. As shown in FIGS. 2 and 4, the end cutting edge 6 that is continuous with the corner R edge 5 is formed in a straight line from near the outer peripheral part on the tip 1a side toward the tool axis O direction up to the vicinity of the tool axis O. The gash face 7a in FIG. 2 is one surface that constitutes the gash 7, the flute 8 is a flute which is a space formed between adjacent cutting edges in the rotation direction around the tool axis, and the flute face 8a is one surface that constitutes the flute 8.

As explained above, in the multi-flute endmill 1 of the present invention, the peripheral cutting edge 4, the corner R edge 5 that is continuous with the peripheral cutting edge 4, and the end cutting edge 6 that is continuous with the corner R edge 5 constitute one cutting edge, and further each one of these cutting edges includes the rake faces 4a, 5a, and 6a and the flanks 4b, 5b, and 6b. When the continuous peripheral cutting edge 4, corner R edge 5, and end cutting edge 6 constitute a single cutting edge unit (one cutting edge), the multi-flute endmill 1 is characterized by including at least 6 or more to 30 or less cutting edges. The number of cutting edges is more preferably set to a maximum of about 20 considering improving the efficiency during cutting, the ease of manufacturing the multi-flute endmill 1 made of ultrahard alloy, and the like.

The multi-flute endmill 1 of the present invention includes the cutting edge part 3 consisting of multiple cutting edges as described above, and is characterized in that even when the corner R edges 5 are used to perform high-feed finishing cutting of an impeller made of a difficult-to-cut alloy or the like using a 3-axis or 5-axis NC machine tool, the wear resistance of the corner R edges 5 is improved, damage such as chipping to the corner R edges 5 is suppressed, and various improvements to the cutting edge part 3 are achieved so that the discharge of chips is improved.

The features of the multi-flute endmill 1 of the present invention will now be explained in detail below.

Figure 19:
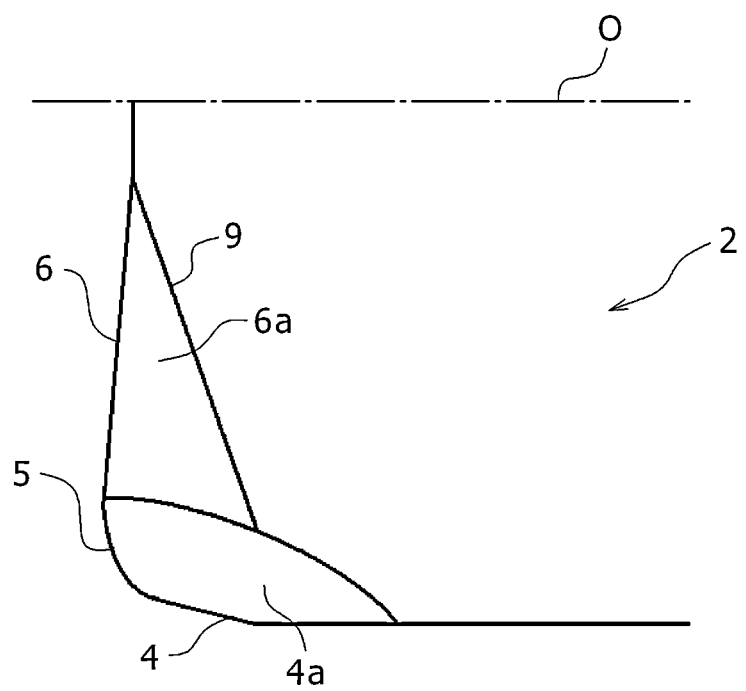
FIG. 19 is a cross-section view showing a relationship between an end cutting edge, a corner R edge, and a peripheral cutting edge that constitute one cutting edge formed in the cutting edge part of a conventional multi-flute endmill.

One of the features is providing the rake face 5*a* to the corner R edge 5. FIG. 19 is a cross-section view showing a relationship between an end cutting edge, a corner R edge, and a peripheral cutting edge that constitute one cutting edge formed in the cutting edge part of a conventional multi-flute endmill. In a conventional endmill used for cutting of an impeller, as shown in FIG. 19, a rake face is not provided to the corner R edge 5, and the rake face 6*a* of the end cutting edge 6 is continuous with the rake face 4*a* of the peripheral cutting edge 4. In such a constitution, a corner of an outer peripheral portion of the corner R edge 5 which is mainly used when cutting an impeller easily becomes sharp and breaks easily. Thus, when performing high-feed, high-efficiency cutting, which is an object of the present invention, there is a high possibility that defects will occur in the corner R edge 5.

Figure 18:
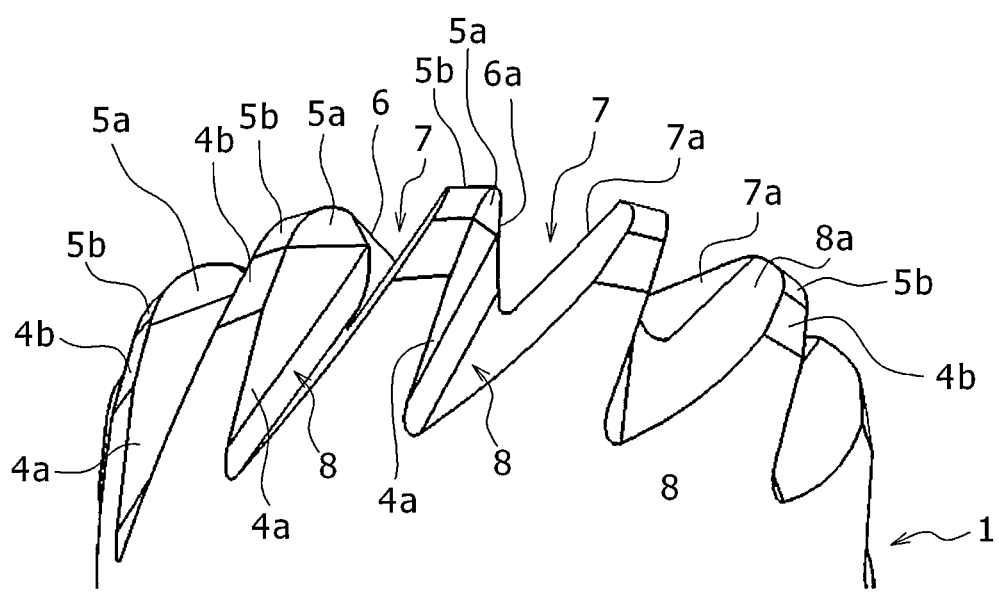
FIG. 18 is a perspective view showing the state of the tip of the multi-flute endmill of the present invention when viewed from the shank side.
Figure 20:
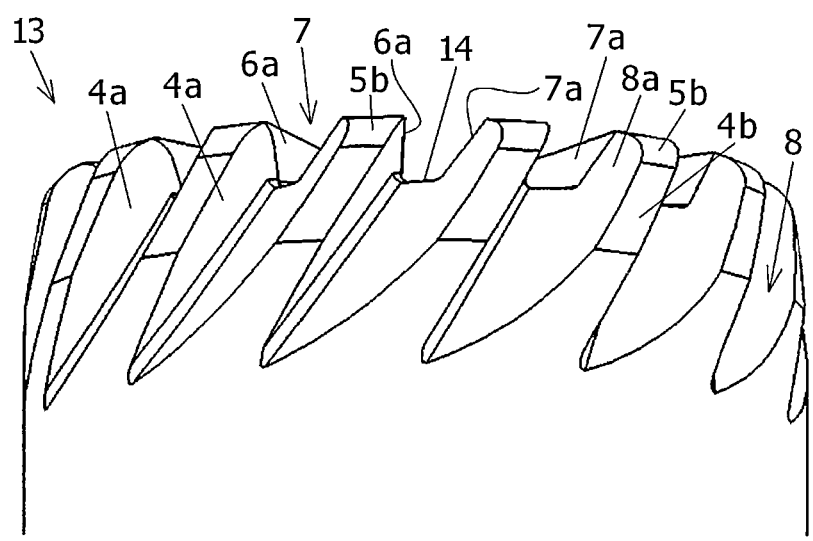
FIG. 20 is a perspective view showing the state of the tip of the endmill disclosed in Patent Document 3 when viewed from the shank side.

As can be understood from a comparison of FIG. 18, which shows the state of the tip 1*a* of the multi-flute endmill 1 of the present invention when viewed from the shank 2 side, and FIG. 20, which shows the state of the endmill of Patent Document 3 when viewed from the shank side, if the rake face 5*a* of the corner R edge 5 is not formed, the angle of the corner R edge 5 formed on the border between the rake face 4*a* of the peripheral cutting edge 4 and the flank 5*b* of the corner R edge 5 (the angle formed by the rake face 4*a* of the peripheral cutting edge and the flank 5*b* of the corner R edge) is small (nearly acute). Thus, when performing high-feed processing, the corner R edge 5 can easily be damaged (break) in a short life due to stress during cutting.

In contrast, if the rake face 5*a* of the corner R edge is formed between the rake face 4*a* of the peripheral cutting edge and the flank 5*b* of the corner R edge as in the multi-flute endmill of the present invention shown in FIGS. 4 and 18, the angles formed by the pairs of surfaces that are adjacent in the rotation direction R, i.e. the rake face 4*a* of the peripheral cutting edge and the rake face 5*a* of the corner R edge as well as the rake face 5*a* of the corner R edge and the flank 5*b* of the corner R edge, are large (the corners are blunt). Thus, when performing high-feed processing, damage (breakage) of the corner R edge 5 is suppressed and it lasts longer compared to the case in which there is no rake face 5*a* of the corner R edge.

The rake face 5*a* of the corner R edge also alleviates the level difference between the rake face 4*a* of the peripheral cutting edge 4 and the flank 5*b* of the corner R edge 5, and thereby contributes to increase the capacity (volume) of the space of the flute 8 constituted by the rake face 4*a* of the peripheral cutting edge. Thus, the rake face 5*a* acts to suppress congestion (build up) of chips within the flute 8 and to facilitate the effect of discharging the chips to the flute 8.

Further, the rake face 5*a* of the corner R edge 5 is positioned between the rake face 6*a* of the end cutting edge 6 and the rake face 4*a* of the peripheral cutting edge 4, and thereby it alleviates the level difference between the rake face 6*a* of the end cutting edge 6 that constitutes the gash 7 and the rake face 4*a* of the peripheral cutting edge 4 that constitutes the flute 8. Thus, the rake face 5*a* also acts as an introducing portion that guides the discharge of chips that have entered the gash 7 to the flute 8. The rake face 5*a* of the corner R edge 5 is also positioned between the rake face 4*a* of the peripheral cutting edge 4 and the flank 5*b* of the corner R edge 5, and thereby it alleviates the level difference between the rake face 4*a* of the peripheral cutting edge 4 that constitutes the flute 8 and the flank 5*b* of the corner R edge 5 and alleviates excessive stress that the corner R edge 5 receives from the impeller (material to be cut) during cutting of the impeller (material to be cut). Thus, the rake face 5*a* also functions to prevent damage to the corner R edge 5.

FIG. 3 illustrates the constitution on the tip side of the cutting edge part 3 when viewing the multi-flute endmill 1 of the present invention from the tool axis O direction, and it shows an example in which 12 cutting edges are provided to the multi-flute endmill 1. FIG. 3 is also a plan view showing the arrangement of the flank 4*b* of the peripheral cutting edge 4, the corner R edge 5, the flank 5*b* of the corner R edge 5, the end cutting edge 6, the flank 6*b* of the end cutting edge 6, the gash 7 (the gash face 7*a*), and the flute 8 (the flute face 8*a*). The symbol "R" in FIG. 3 indicates the rotation direction of the multi-flute endmill 1 when performing cutting.

In FIGS. 2, 3, 11, 18, etc., lines are inserted to indicate the border between the flank 6*b* of the end cutting edge 6 and the flank 5*b* of the corner R edge 5 that are adjacent in the radial direction, and the border between the flank 5*b* of the corner R edge 5 and the flank 4*b* of the peripheral cutting edge 4 that are adjacent in the radial direction. However, these lines may not actually be able to be seen by the naked eye. For example, the border lines cannot be seen when the curvature of a curved surface (including a flat surface) at which the adjacent flank 6*b* of the end cutting edge 6 and flank 5*b* of the corner R edge 5 and the adjacent flank 5*b* of the corner R edge 5 and flank 4*b* of the peripheral cutting edge 4 are adjacent in the fashion of a clothoid curve when viewed in the in-plane direction (circumferential direction) gradually changes. However, a line can be seen in the portion in which the curvature changes.

The peripheral cutting edge 4, the corner R edge 5, and the end cutting edge 6 that constitute each of the 12 cutting edges shown in FIG. 3 are formed at equal intervals centered on the tool axis O. Further, the gash 7 is formed between the rake face 6*a* of a certain end cutting edge 6 and a flank 6*b* of another end cutting edge 6 that is adjacent to the certain end cutting edge 6 in the rotation direction R. The gash 7 is formed by a gash face 7*a*, which forms a surface that is continuous with the flank 6*b* of the end cutting edge 6 on the rearward side in the rotation direction R and is different from the flank 6*b* of the end cutting edge 6, and the rake face 6*a* of an end cutting edge 6 that is adjacent to the end cutting edge 6 on the forward side in the rotation direction R. The rake face 6*a* of the end cutting edge 6 and the gash face 7*a* that constitute the gash 7 are both flat surfaces that retreat approaching a predetermined angle relative to the rotation direction R, or in other words they are formed to be inclined from the radial direction toward the rearward side in the rotation direction R from a certain cross-section that is orthogonal to the tool axis O up to another cross-section that is orthogonal to the tool axis O when moving in the axial direction when viewed at a cross-section that is orthogonal to the tool axis O of the multi-flute endmill 1.

FIG. 18 is a perspective view showing the state of the tip 1*a* of the multi-flute endmill 1 of the present invention when viewed from the shank 2 side. As shown in FIGS. 11 and 18, in the multi-flute endmill 1 of the present invention, the rake face 6*a* of the end cutting edge and the gash face 7*a* are both inclined from on a straight line in the radial direction toward a parallel straight line in the radial direction when moving toward the rearward side in the rotation direction R from a certain cross-section that is orthogonal to the tool axis O up to another cross-section that is orthogonal to the tool axis O when moving in the axial direction, and each face forms a different surface (a flat surface or a curved surface). Thereby, the intersection line at which these two faces intersect is the deepest part of the gash 7.

Figure 21:
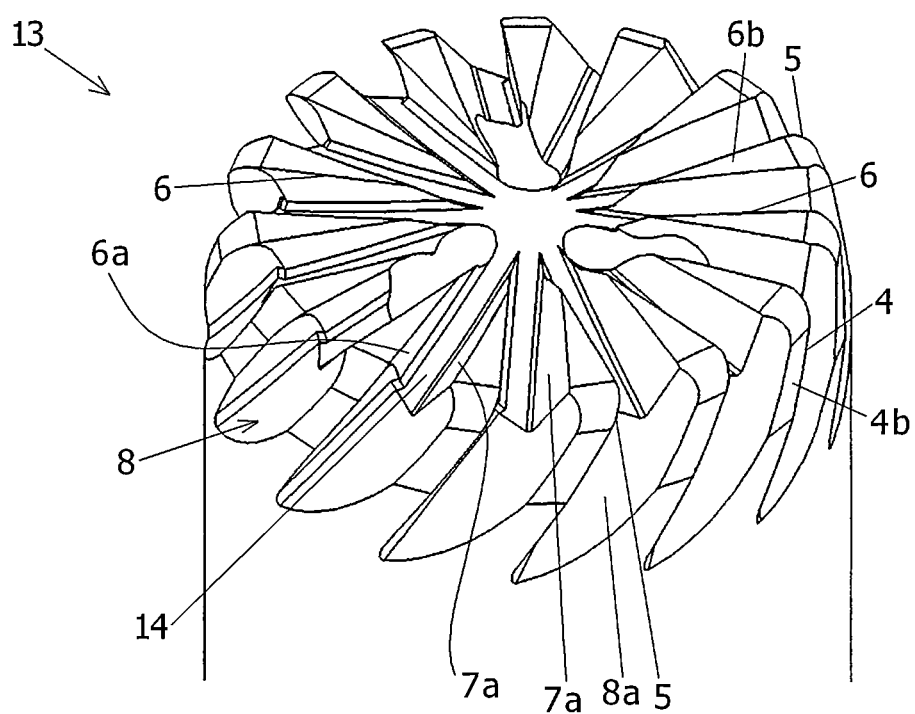
FIG. 21 is a perspective view showing the state of the tip of the endmill disclosed in Patent Document 3 when viewed from the tip side to the shank side.

FIG. 20 is a perspective view showing the state of the tip of the endmill disclosed in Patent Document 3 when viewed from the shank side. FIG. 21 is a perspective view showing the state of the tip of the endmill disclosed in Patent Document 3 when viewed from the tip side to the shank side. If the gash 7 is formed so that the rake face 6*a* of the end cutting edge 6 and the gash face 7*a* are parallel like the gash 7 of the endmill 13 disclosed in Patent Document 3 shown in FIGS. 20 and 21, the rake face 6*a* of the end cutting edge and the gash face 7*a* do not intersect, and thus no intersection line is formed. Therefore, a gash bottom surface 14, which is a flat surface that is separate from the rake face 6*a* of the end cutting edge and the gash face 7*a*, becomes the bottom (deepest part) of the gash 7. As explained above, the present invention and the endmill disclosed in Patent Document 3 are clearly different with regard to the structure of the surfaces that form the gash 7.

In FIG. 3, the gash face 7*a* appears to be a flat surface whose width gradually expands from the vicinity of the tool axis O toward the outer peripheral direction. However, the gash face 7*a* actually is formed into a flat surface shape that is inclined by, for example, 45°, to the rearward side in the rotation direction R from an end of the flank 6*b* of the end cutting edge 6 toward the bottom end of the rake face 6*a* of the adjacent (in the direction opposite to the rotation direction R) end cutting edge 6. The space formed by the gash face 7*a* and the rake face 6*a* of the end cutting edge forms the gash 7 for discharging chips, and the gash 7 is in communication with the flute 8. The intersection line of the gash face 7*a* and the rake face 6*a* of the end cutting edge 6 is inclined from the tip 1*a* side to the shank 2 side from the tool axis O toward the outer peripheral side in the radial direction.

The flute 8 that is continuous with the gash 7 is formed by the rake face 4*a* of the peripheral cutting edge 4 (refer to FIG. 11) and a surface (the flute face 8*a*) that opposes the rake face 4*a* on the forward side in the rotation direction R as explained above. The rake face 4*a* of the peripheral cutting edge 4 and the flute face 8*a* may each form a surface that is continuous with the rake face 6*a* of the end cutting edge 6 and the gash face 7*a* that constitute the gash 7, or a surface whose curvature continuously changes. However, it is possible to improve the discharge of chips to the flute 8 by rotation of the multi-flute endmill 1 (shank 2) by making the gash 7 and the flute 8 non-continuous with each other.

The space created by the combination of the space of the flute 8 and the space of the gash 7 is called a "chip pocket CP" as will be explained later. If the diameter of the shank 2 and the number of cutting edges is constant, the chip discharge effect increases as the capacity (volume) of the chip pocket CP increases. Thus, in terms of chip discharge, it is preferable to make at least one of the space of the gash 7 and the space of the flute 8 large. Thus, for example, if the rake face 6*a* of the end cutting edge 6 and the gash face 7*a* that opposes the rake face 6*a* on the forward side in the rotation direction R are formed so that they intersect each other, the space of the gash 7 can be formed largely without losing any rigidity.

In this way, by forming the gash 7, which is the space formed by the gash face 7*a* and the rake face 6*a* of the end cutting edge 6, defects and chipping caused by insufficient rigidity of the end cutting edge 6 can be prevented even when performing high-feed, high-efficiency cutting. Further, chips formed by the end cutting edge 6 can be carried to the flute 8 with good efficiency, and thus clogging of chips in the space of the gash 7 can also be prevented.

The cross-section shape of the gash 7 is preferably formed into a V-shape or a U-shape. Due to this structure, the volume of the chip pocket CP to be explained later can be increased, and thus the discharge of the large amount of chips generated by high-feed cutting can be remarkably improved. Therefore, high-feed processing which was conventionally difficult can be realized when an alloy material that is difficult to cut is the material to be cut.

Figure 22:
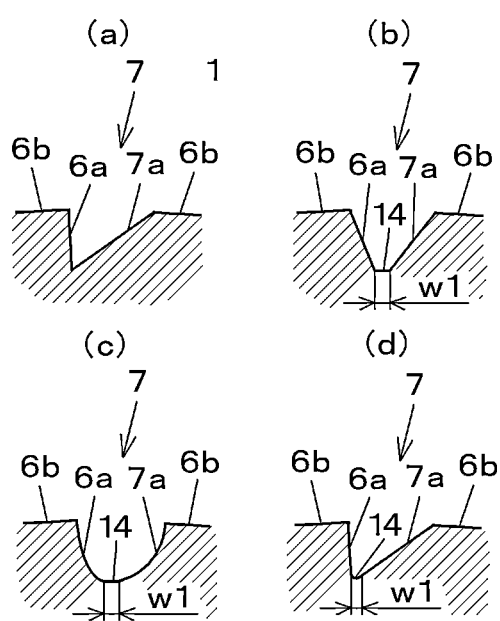
FIG. 22 shows cross-section views when the gash of the multi-flute endmill of the present invention is cut at a plane that is parallel to the tool axis and intersects the two surfaces of the gash face and the rake face of the end cutting edge that are adjacent along the rotation direction.

FIG. 22 shows cross-section views when the gash 7 is cut at a plane that is parallel to the tool axis O and intersects the two surfaces of the gash face 7*a* and the rake face 6*a* of the end cutting edge 6 that are adjacent along the rotation direction. The diagonal lines in FIG. 22 indicate cross-section lines. As shown in FIG. 22A, in the endmill of the present invention, the cross-section shape of the gash 7 that is a space formed by the gash face 7*a* and the rake face 6*a* of the end cutting edge 6 is ideally V-shaped, or preferably a shape that approximates a V-shape.

However, in terms of industrial production, as shown in FIG. 22B, an approximately V-shaped gash 7 is allowed, in which a gash bottom surface 14 having a very small gash bottom surface width w1 is formed at the deepest part of the gash 7.

As an alternative embodiment of the gash 7 of the multi-flute endmill of the present invention, in addition to a U-shaped gash 7 formed with a curved surface, as shown in FIG. 22C, an approximately U-shaped gash 7 is also allowed, in which a gash bottom surface 14 having a very small width w1 is formed at the deepest part of the approximately U-shaped gash 7, which is formed by the gash face 7*a* shaped in a gently curved fashion and the rake face 6*a* of the end cutting edge 6 shaped in a gently curved fashion. In other words, the rake face 6*a* of the end cutting edge 6 and the gash face 7*a* in the multi-flute endmill 1 of the present invention include a case in which they are formed with a strict flat surface and a case in which they are formed with a gently curved surface.

Hereinafter, in the multi-flute endmill 1 of the present invention, the V-shaped gash 7, U-shaped gash 7, approximately V-shaped gash 7, and approximately U-shaped gash 7 will all be referred to identically as the "V-shaped gash". FIGS. 22B and 22C illustrate the gash 7 in which the gash bottom surface 14 is formed in a flat shape. However, as shown in FIG. 22D, the gash 7 of the present invention also includes a case in which the gash bottom surface 14 is formed in a curved shape having a very small curvature radius.

In the cases of FIGS. 22A, 22B, and 22C, based on experimental results, it was found that the width w1 of the gash bottom surface, which is a width of the very small gash bottom surface 14 in the circumferential direction, is preferably 0.6 mm or less, and more preferably 0.4 mm or less in order to achieve the advantageous effects of the present invention. If the width w1 of the gash bottom surface 14 exceeds 0.6 mm, the discharge performance of the chips generated by the end cutting edge 6 decreases along with the increase in the width w1 of the gash bottom surface 14. Thus, the effect of being able to perform high-feed processing, which is advantageous over conventional endmills, is compromised.

Figure 23:
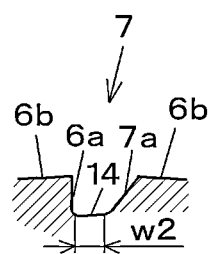
FIG. 23 is a cross-section view when the gash of the endmill disclosed in Patent Document 3 is cut at a plane that is parallel to the tool axis and intersects the two surfaces of the gash face and the rake face of the end cutting edge that face each other along the rotation direction.

FIG. 23 is a cross-section view when the gash of the endmill disclosed in Patent Document 3 is cut at a plane that is parallel to the tool axis and intersects the two surfaces of the gash face 7*a* and the rake face 6*a* of the end cutting edge 6 that face each other along the rotation direction. The diagonal lines in FIG. 23 indicate cross-section lines. As shown in FIG. 23, in the case of the endmill disclosed in Patent Document 3, which is a conventional endmill, a gash bottom surface 14 having a wide gash bottom surface width w2 is formed at the deepest part of the gash 7 including the gash face 7a and the rake face 6a of the end cutting edge 6 arranged facing each other, which differs from the multi-flute endmill of the present invention. In the endmill disclosed in Patent Document 3, the width w2 of the gash bottom surface at the deepest part of the gash 7 that is opened at one end and has a brachymorphic cross-section shape is 0.9 mm, and this is significantly larger than the width w1 of the gash bottom surface in the multi-flute endmill of the present invention.

Next, the positional relationship between the rake face 6a of the end cutting edge 6, the rake face 5a of the corner R edge 5, and the rake face 4a of the peripheral cutting edge 4, which is one feature of the multi-flute endmill 1 of the present invention, will be explained referring to FIG. 4. FIG. 4 is a cross-section view illustrating a relationship between the end cutting edge 6, the corner R edge 5, and the peripheral cutting edge 4 that constitute one cutting edge.

As shown in FIG. 4, in the end cutting edge 6, the rake face 6a of the end cutting edge is formed on a surface at which the cutting edge ridge line is oriented in the rotation direction R from the vicinity of the tool axis O toward the direction at which the peripheral cutting edge 4 exists. In FIG. 4, the rake face 6a of the end cutting edge 6 is formed in a flat surface shape, and as explained above, the flat surface retreats approaching a predetermined angle relative to the rotation direction R, or in other words is inclined from the forward side toward the rearward side in the rotation direction R from an end surface to the shank 2 of the multi-flute endmill 1. Therefore, the volume (V) of the chip pocket CP is large.

The rake face 5a of the corner R edge 5 that forms a convex gently curved surface is formed on a surface at which the cutting edge ridge line of the corner R edge 5 is oriented in the rotation direction R. The rake face 5a of the corner R edge 5 that forms a convex curved surface is formed to be curved so as to create a slight downward incline toward the cutting edge ridge line of the corner R edge 5. A portion at the end on the peripheral cutting edge 4 side of the rake face 6a of the end cutting edge 6 is continuous with the rake face 5a of the corner R edge 5. In the corner R edge 5 including the rake face 5a that forms a convex curved surface as described above, the degree of sharpness of the corner is eased compared to the conventional endmill shown in FIG. 19 in which the rake face 5a of the corner R edge is not provided to the corner R edge 5. Therefore, wear and chipping of the corner R edge 5 can be suppressed. The rake face 5a of the corner R edge is, for example, formed by contacting a side surface of a diamond grind stone to the corner R edge 5 in a state in which the multi-flute endmill 1 is fixed to an NC grinder.

The rake face 4a is formed on a surface at which the cutting edge ridge line of the peripheral cutting edge 4 is oriented in the rotation direction R. The rake face 4a of the peripheral cutting edge 4 is preferably formed to create a convex gently curved surface. As shown in FIGS. 4 and 11, the end on the end cutting edge 6 side of the rake face 4a of the peripheral cutting edge 4 is continuous with the rake face 5a of the corner R edge 5, and the end on the tool axis O side is continuous with the rake face 6a of the end cutting edge 6. The rake face 4a of the peripheral cutting edge 4 is formed to cut toward the tool axis O side in the radial direction surpassing the peripheral cutting edge 4 formation starting point P1 up to the outer peripheral part of the shank 2. The rake face 4a which is formed up to the outer peripheral part of the shank 2 also serves as one flute face among the at least two flute faces that constitute the flute 8 as described above. Reference numeral "9" in FIG. 4 indicates a border line between the rake face 6a of the end cutting edge 6 and the gash face 7a (refer to FIG. 2). The border line 9 is inclined from the vicinity of the tool axis O toward the outer periphery direction from the tip 1a side to the shank 2.

As described above, the V-shaped gash 7 is formed between the gash face 7a and the rake face 6a of the end cutting edge 6, and this V-shaped gash 7 and the flute 8 form the chip pocket CP for smoothly discharging chips. The border line 9 of the rake face of the end cutting edge 6 and the gash face 7a is inclined from the vicinity of the tool axis O toward the outer peripheral direction, and thus an effect of increasing the volume (V) of the chip pocket CP per one cutting edge is achieved.

In the multi-flute endmill 1 of the present invention, as described above, the rake face 6a of the end cutting edge 6 is formed to create a flat surface or a curved surface. The rake face 5a of the corner R edge 5 and the rake face 4a of the peripheral cutting edge 4 are both formed to create a flat surface or a gently curved surface. As shown in FIG. 4, the rake face 5a of the corner R edge 5 and the rake face 4a of the peripheral cutting edge 4 are both continuous with the rake face 6a via a step part 10 so as to be positioned on the rearward side in the rotation direction R relative to the rake face 6a of the end cutting edge 6.

For example, if the rake face 5a of the corner R edge 5 and the rake face 4a of the peripheral cutting edge 4 are formed to be parallel with or positioned on the forward side in the rotation direction R of the rake face 6a of the end cutting edge 6, chips cut by the corner R edge 5 or the end cutting edge 6 move toward the rake face 6a of the end cutting edge 6 and collect in the vicinity of the tool axis O, and this may lead to jamming of the chips or chipping of the cutting edges. In contrast, by positioning the rake face 5a of the corner R edge 5 and the rake face 4a of the peripheral cutting edge 4 on the rearward side in the rotation direction R relative to the rake face 6a of the end cutting edge 6, the chips tend to be discharged from the tool axis O side to the outer peripheral side in the radial direction, and thus a smooth flow of discharge from the chip pocket CP to the direction of the flute 8 is easily achieved.

The "rake face 5a of the corner R edge 5 that is adjacent to the rake face 6a of the end cutting edge 6 and forms a surface different from the rake face 6a of the end cutting edge 6" in the present invention means that the rake face 5a of the corner R edge 5 forms a curved surface that is continuous with the rake face 6a of the end cutting edge 6, and also means that the rake face 5a of the corner R edge 5 creates an adjacent surface while forming a different flat surface or curved surface rather than a continuous curved surface. The same applies to the "rake face 4a of the peripheral cutting edge 4 that is adjacent to the rake face 5a of the corner R edge 5 and forms a surface different from the rake face 5a of the corner R edge 5". Since the rake face 5a of the corner R edge 5 is adjacent to both the rake face 6a of the end cutting edge 6 and the rake face 4a of the peripheral cutting edge 4, it is positioned between the rake face 6a of the end cutting edge 6 and the rake face 4a of the peripheral cutting edge 4 when viewed in the radial direction of the shank 2 or when viewed in the axial direction along the peripheral surface of the shank 2.

Figure 16:
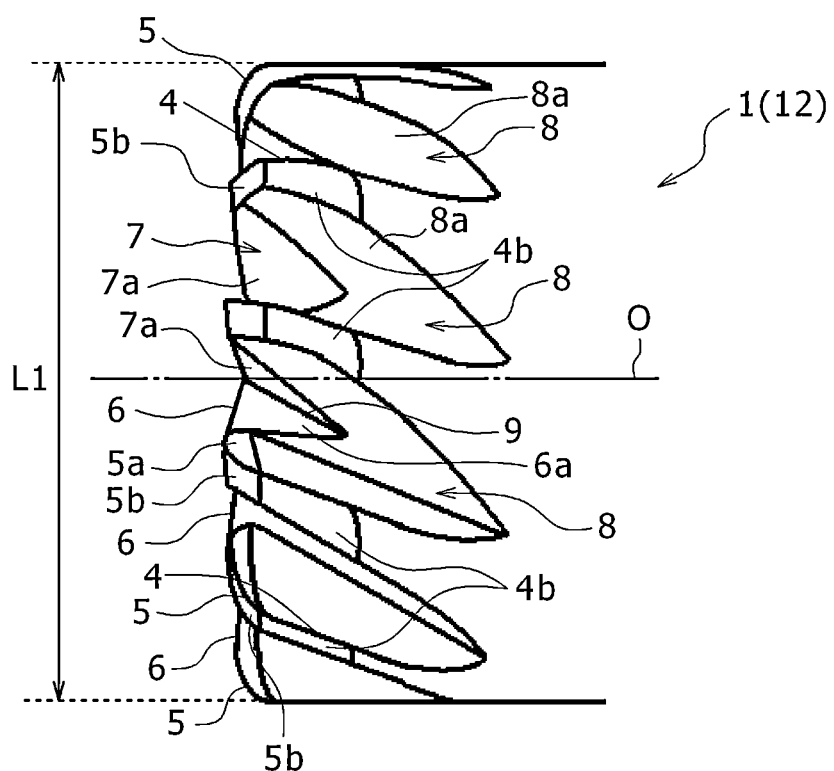
FIG. 16 is an enlarged view of aside surface view showing another embodiment of the multi-flute endmill of the present invention when the peripheral cutting edges are formed approximately parallel to the tool axis direction.

The peripheral cutting edge 4 does not necessarily have to be formed so that the tangent line of the peripheral cutting edge 4 that passes through the "peripheral cutting edge 4 formation starting point P1" and the tool axis O create an angle α as shown in FIG. 2 (the peripheral cutting edge 4 does not necessarily have to be inclined downward with an inclination angle α in the tool axis O direction). As shown in FIG. 16, the peripheral cutting edge 4 can be formed approximately parallel to the tool axis O direction. FIG. 16 shows a case in which the inclination angle α of the peripheral cutting edge 4 shown in FIG. 2 is "0°", or in other words the peripheral cutting edge 4 is parallel to the tool axis O.

In the case that the inclination angle α of the peripheral cutting edge 4 is "0°" as shown in FIG. 16, the cutting edge diameter of the multi-flute endmill 1 at the peripheral cutting edge 4 formation starting point P1 becomes L1. When this multi-flute endmill 1 is retained with a 5-axis NC machine tool to cut an impeller, it is necessary to execute tilt control of the multi-flute endmill 1 and tilt control of the impeller itself by NC control. Therefore, penetration of the peripheral cutting edge 4 into the impeller processing surface can also be controlled by the above controls. Thereby, the same effects that are achieved by the multi-flute endmill 1 in which the inclination angle α of the peripheral cutting edge 4 is set as shown in FIG. 2 (α is from 5° or more to 10° or less) can also be achieved by the multi-flute endmill 1 in which the inclination angle α of the peripheral cutting edge 4 is "0°".

Figure 17:
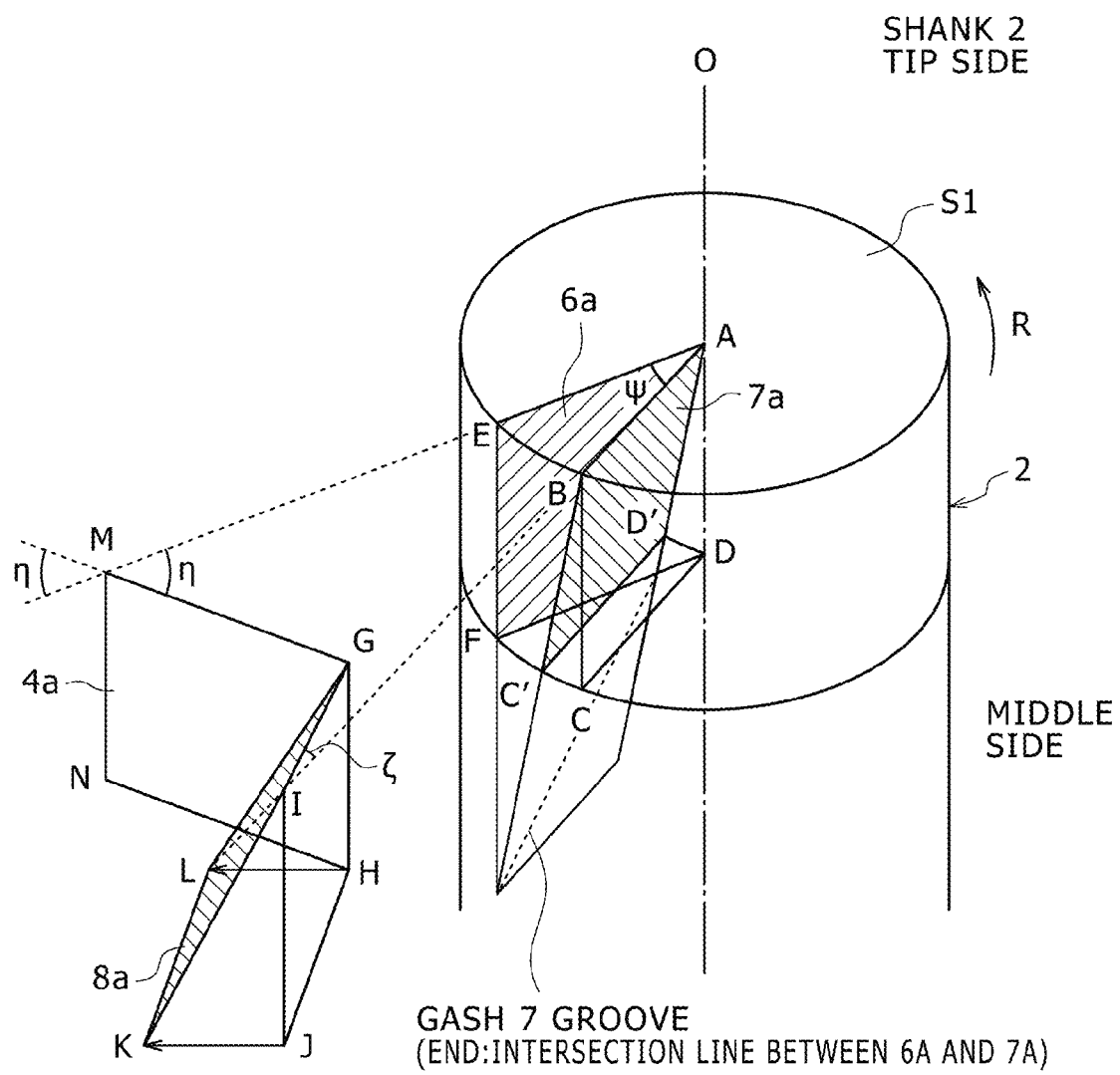
FIG. 17 is a model that schematically illustrates the state of formation of the rake face of the end cutting edge and the gash face that constitute the gash and the rake face of the peripheral cutting edge and the flute face that constitute the flute of the multi-flute endmill of the present invention.

FIG. 17 is a model that schematically illustrates the state of formation of the rake face 6a of the end cutting edge 6 and the gash face 7a that constitute the gash 7 and the rake face 4a of the peripheral cutting edge 4 and the flute face 8a that constitute the flute 8 of the multi-flute endmill 1 of the present invention. In the multi-flute endmill 1 of the present invention, the line (intersection line) at which the rake face 6a of the end cutting edge 6 and the gash face 7a intersect each other, shown by a dashed line in FIG. 17, is the bottom (deepest part) of the gash 7. The bottom of the gash 7 is inclined from the tip 1a side toward the middle side of the multi-flute endmill 1 from the tool axis O up to the outer peripheral side in the radial direction.

As shown in FIG. 17, the rake face 6a of the end cutting edge 6 and the gash face 7a that opposes the rake face 6a on the forward side in the rotation direction which constitute the gash 7 create intersecting surfaces (including a flat surface and a curved surface) that include straight lines AB and AE in the radial direction that pass through the tool axis O in a cross-section S1 that is orthogonal to the tool axis O and mutually form an angle φ in the rotation direction on the tool axis O. Further, in FIG. 17, at least the gash face 7a intersects the rake face 6a (face including AEFD) of the end cutting edge 6 in a state in which the gash face 7a forms a surface (including a twisted surface) ABC'D' that is inclined toward the rearward side in the rotation direction from the tip 1a side to the middle of the shank 2 relative to a flat surface ABCD including the straight line AB in the radial direction that passes through the tool axis O. Thereby, the rake face 6a of the end cutting edge 6 and the gash face 7a that constitute the gash 7 intersect each other.

The angle φ is preferably 10° to 35°, and more preferably 15° to 30°. If the angle φ is less than 10°, it is recognized that there is a tendency for the chip discharge performance to decrease, and if the angle φ is more than 35°, it is recognized that there is a tendency for the selection width of cutting conditions to become narrow.

The "at least the gash face 7a" described above means that the "rake face 6a of the end cutting face 6", which is the other surface that constitutes the gash 7, may also form a surface (including a twisted surface) that is inclined toward the rearward side in the rotation direction R from the tip 1a side to the middle of the shank 2 relative to a flat surface ABCD including the straight line AB in the radial direction that passes through the tool axis O.

In this case, as shown in FIGS. 17, 22A, 22D, and the like, the two surfaces that constitute the gash 7 (the rake face 6a of the end cutting face 6 and the gash face 7a) intersect on the tool axis O when viewed in the axial direction of the shank 2 (the tool axis O direction). Thus, the gash 7 is formed in a fan shape that has a central angle when viewing the shank 2 in the tool axis O direction. Accordingly, it is possible to form the gash 7 from a portion (region) near the center in the axial direction between cutting edges that are adjacent in the circumferential direction (rotation direction R), and it is possible to secure a maximum flat surface area (projected area) when viewing the gash 7 in the axial direction.

Further, since the two surfaces that constitute the gash 7 (the rake face 6a of the end cutting face and the gash face 7a) intersect at the middle in the axial direction of the shank 2, the straight line or curved line (groove) formed by the (intersection of) the two surfaces is inclined from the tip side in the axial direction toward the middle side of the shank 2 from the center up to the outer peripheral side of the shank 2. Therefore, the discharge (guiding) of chips from the groove (valley) of the gash 7 to the flute 8 is remarkably improved, and turning of the chips toward the adjacent cutting edges (end cutting edge 6 and corner R edge 5) on the rearward side in the rotation direction R is simultaneously suppressed. In FIG. 17, the "gash 7 groove" indicated with a dashed line shows an intersection line between the rake face 6a of the end cutting edge and the gash face 7a.

Since the two surfaces that constitute the gash 7 (the rake face 6a of the end cutting face 6 and the gash face 7a) are formed in a fan shape that has a central angle, as shown in FIG. 4, the end cutting edge 6 remaining upon the formation of the gash 7 can be formed across almost the entire length in the radial direction of the tip 1a of the multi-flute endmill 1 except for a center part of a cross-section on the tool axis O side at which the ends of the gash 7 on the tool axis O side assemble. As a result, compared to the conventional technology shown in FIG. 21, the cutting length of the end cutting edge 6 in the present invention is large, and thus the present invention is advantageous in that the region for cutting by the end cutting edge 6 is enlarged and the degree of freedom of cutting, such as the selection of segments of cutting by the end cutting edge 6, is increased. In the multi-flute endmill 1 of the present invention, the width of the flank 6b of the end cutting edge 6 gradually decreases from the outer peripheral surface of the shank 2 toward the tool axis O side, but the flank 6b has a width in the rotation direction R that extends across almost the entire length in the radial direction.

In contrast, as shown in FIG. 21, in the example of the endmill disclosed in Patent Document 3, the width of the gash 7 is approximately constant in the rotation direction R. Therefore, the end cutting edge 6 cannot be formed across almost the entire length in the radial direction of the tip 1a of the multi-flute endmill 1. Thus, the cutting length of the end cutting edge 6 is small, the region for cutting by the end cutting edge 6 is narrow, and the degree of freedom of cutting is also limited.

As a further preferred embodiment of the present invention, as shown in FIG. 17, it is possible to constitute the flute 8 from the rake face 4a of the peripheral cutting edge 4, which serves as one of the flute faces, and the flute face 8a that opposes the rake face 4a of the peripheral cutting edge 4 on the forward side in the rotation direction R, and form the gash face 7a and the flute face 8a so that the flute face 8a forms a surface (GIKL) that is inclined such that its outer peripheral side or inner peripheral side in the radial direction creates an inclination angle ξ to the rearward side in the rotation direction R relative to the gash face 7a that forms the flat surface ABC'D' including the straight line AB in the radial direction that passes through the tool axis O. Thereby, an effect is enabled in which chips that are fed (discharged) from the gash 7 to the flute 8 are turned around to the rearward side in the rotation direction R within the flute 8.

The inclination angle ξ described above is preferably 5° to 45°, and more preferably 10° to 35°. If the angle ξ is less than 5°, it is recognized that there is a tendency for the effect of feeding the chips from the gash 7 to the flute 8 to decrease, and if the angle ξ is more than 45°, it is recognized that there is a tendency for the rigidity of the corner R edge 5 to decrease.

The flute face 8a (GIKL) that opposes the rake face 4a of the peripheral cutting edge 4 is inclined relative to the gash face 7a (ABC'D') toward the forward side in the rotation direction from the inner peripheral side in the radial direction to the outer peripheral side in the radial direction of the cutting edge part 3 and inclined toward the rearward side in the rotation direction from the tip to the middle of the cutting edge part 3. The surface (GIKL) that is inclined such that its outer peripheral side or inner peripheral side in the radial direction creates an inclination angle ξ to the rearward side in the rotation direction R relative to the gash face 7a shown in FIG. 17 is the same as stating that a surface (GIJH) that is inclined such that its outer peripheral side or inner peripheral side in the radial direction creates an inclination angle to the rearward side in the rotation direction R relative to the surface (extension surface of ABCD) including the flat surface ABCD that passes through the straight line AB in the radial direction that passes through the tool axis O further forms a surface (GIKL) whose middle part in the tool axis O direction (bottom side of FIG. 17) is inclined to the rearward side in the rotation direction R. As shown in FIG. 17, the surface that is inclined such that its outer peripheral side or inner peripheral side in the radial direction creates an inclination angle ξ to the rearward side in the rotation direction R relative to the surface (extension surface of ABCD) including the flat surface ABCD that passes through the straight line AB in the radial direction that passes through the tool axis O is GIJH, and the surface whose middle part in the tool axis O direction of the surface GIJH is inclined to the rearward side in the rotation direction R is GIKL.

Further, if the rake face 4a of the peripheral cutting edge 4 that also serves as one flute face of the flute 8 forms a surface (GMNH) that is inclined such that its outer peripheral side or inner peripheral side in the radial direction creates an inclination angle η to the rearward side in the rotation direction R relative to the rake face 6a of the end cutting edge 6 (surface including AEFD), the rake face 4a (GMNH) of the peripheral cutting edge 4 forms a surface from a point G located more toward the tool axis O side than the outer peripheral surface of the shank 2 up to a point M on the outer peripheral side from the forward side toward the rearward side in the rotation direction R. Therefore, an effect is enabled in which chips are turned around to the rearward side in the rotation direction R within the flute 8 so as to improve the discharge of chips.

The inclination angle η described above is preferably 0.5° to 20°, and more preferably 3° to 10°. If the angle η is less than 0.5°, it is recognized that there is a tendency for the discharge performance of chips from the flute 8 to decrease, and if the angle η is more than 20°, the rigidity of the connecting part P2 of the peripheral cutting edge and the corner R edge tends to decrease.

In the following explanation of the multi-flute endmill of the present invention, a space consisting of the sum of the V-shaped gash 7 formed by the gash face 7a and the rake face 6a of the end cutting edge 6 explained above, i.e. the gash 7 which is a space formed between adjacent cutting edges, and the flute 8 that is in communication with the gash 7 formed between the cutting edges is referred to as the "chip pocket (CP)" per one cutting edge. The chip pocket (CP) indicates, for example, the space filled by diagonal lines in FIG. 11, which is a perspective view of the cutting edge part 3 of the multi-flute endmill 1. In FIG. 11, the chip pocket CP per one cutting edge is shown at only one location filled with diagonal lines, but the number of locations that correspond to the chip pocket CP per one cutting edge is the same as the number of cutting edges.

One feature of the multi-flute endmill 1 of the present invention is that the volume (V) of the chip pocket CP per one cutting edge is set to a range of from 25 $mm^3$ or more to 120 $mm^3$ or less when an edge diameter L1 (diameter of the shank 2) of the multi-flute endmill at the starting point of formation of the peripheral cutting edge 4 shown in FIG. 2 is 10 mm to 30 mm and the number of cutting edges is 6 to 30. The volume (V) of the chip pocket CP indicates the volume (capacity) of the material removed by the formation of the gash 7 and the flute 8 from the solid multi-flute endmill 1 before forming the gash 7 and the flute 8.

The multi-flute endmill 1 of the present invention includes at least 6 cutting edges, and has a unique cutting edge part 3 structure as described above that is suitable as an endmill for performing high-speed, high-feed cutting of an impeller having a curved surface using a 3-axis or 5-axis NC machine tool. The upper limit of the number of cutting edges is preferably around 30 in the multi-flute endmill 1 in which the edge diameter L1 at the starting point of formation of the peripheral cutting edge 4 is 30 mm. In the multi-flute endmill 1 of the present invention, the reason that the number of cutting edges is set to a range of from 6 or more to 30 or less is explained below.

An impeller can be subjected to high-feed cutting at increased cutting depths ae and ap using the multi-flute endmill 1 of the present invention. However, in order to perform the processing at even higher efficiency, it is necessary to raise the feed rate Vf. Thus, in order to raise the feed rate Vf, it is necessary to raise the feed amount fz [mm/t] per one cutting edge or raise the cutting speed Vc [m/min]. However, when cutting an alloy material that is difficult to cut such as Inconel (registered trademark) 718, a rise in the temperature generated during cutting becomes a problem. The cutting temperature increases as the number of rotations of the main shaft (the cutting speed Vc of the tool) increases, and a rise in the cutting temperature causes damage to the hard coating that is coated on the surface of the endmill and this leads to a shortening of the life of the endmill. Therefore, the cutting speed cannot be raised that much. For example, for a nickel-based heat-resistant alloy material, the limit is approximately Vc=80 m/min.

If the feed amount fz per one cutting edge is raised too much, the load on the cutting edge tip of the endmill becomes too great, and thus the feed amount fz per one cutting edge cannot be increased too much. In particular, if the feed amount fz per one cutting edge exceeds 0.3 mm/t, the load on the cutting edge tip becomes considerable.

Therefore, in order to realize high-efficiency processing, it is necessary to increase the number of cutting edges. If an endmill having at least 6 cutting edges is not used, it is difficult to perform high-efficiency processing compared to a conventional endmill having 2 or 4 cutting edges. If a multi-flute endmill having more than 30 cutting edges is used, the chip pocket CP becomes too small, and thus chips can easily clog near the tool axis O or within the gash 7. This can lead to jamming of the clogged chips and chipping of the cutting edges.

When performing high-feed cutting on an impeller made of nickel-based super-heat-resistant alloy or the like with a 3-axis or 5-axis NC processing machine using the corner R edge 5 of the multi-flute endmill 1 of the present invention, for example, in order to perform cutting at high efficiency, the cutting conditions are set to high values such as an axial direction cutting depth ap of 0.8 mm to 2.0 mm (preferably 1.0 to 1.5 mm) and a radial direction cutting depth ae of 1 to 10 mm (preferably 1 to 5 mm). Further, the feed amount fz per one cutting edge is set to 0.08 to 0.3 mm/t (preferably 0.1 to 0.2 mm/t), and the number of cutting edges of the multi-flute endmill 1 is increased. Thereby, the overall cutting efficiency until completion of finishing of the impeller can be remarkably improved over conventional endmills.

Given the above, in the multi-flute endmill 1 of the present invention, the number of cutting edges is preferably 6 or more and the upper limit thereof is 30 or less. If the axial direction cutting depth ap, the radial direction cutting depth ae, and the feed amount fz per one cutting edge are less than the specific ranges mentioned above, no advantages over conventional high-feed processing can be recognized. Further, if the axial direction cutting depth ap, the radial direction cutting depth ae, and the feed amount fz per one cutting edge exceed the specific ranges mentioned above, the life of the tool is remarkably decreased and thus impractical.

Figure 9:
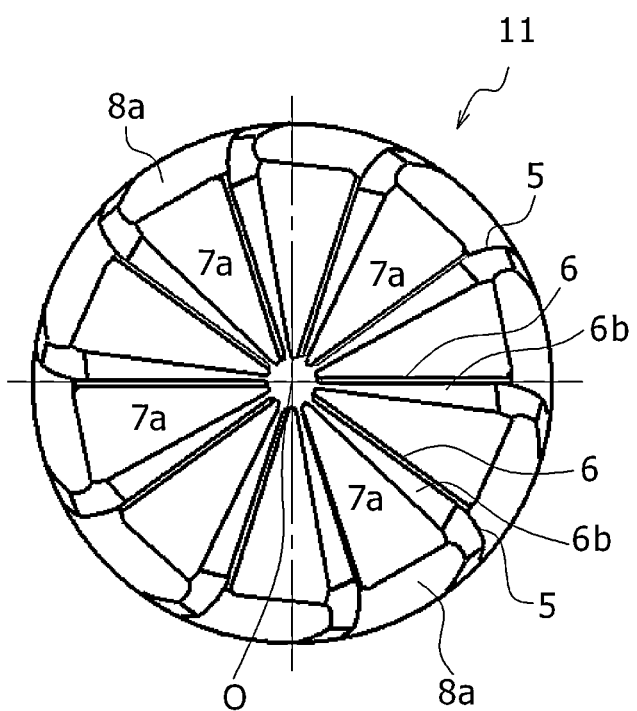
FIG. 9 is an end surface view showing the state of the cutting edge part of the multi-flute endmill of the present invention when the number of cutting edges is 10 when viewed from the end surface side in the tool axis direction.
Figure 10:
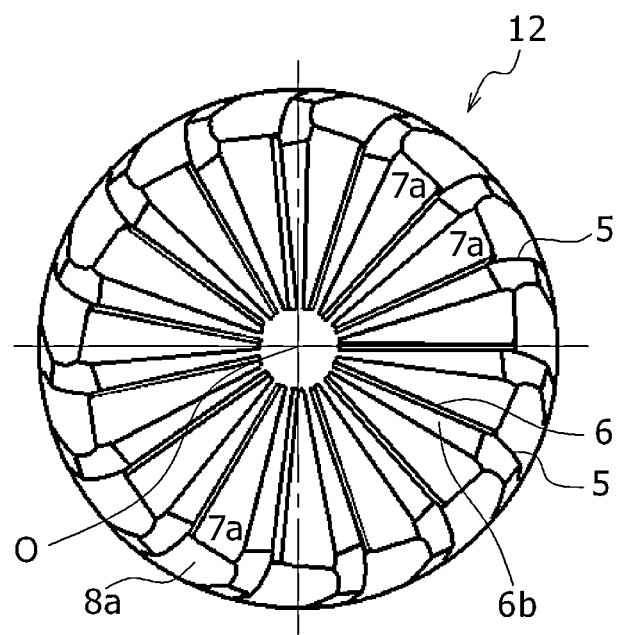
FIG. 10 is an end surface view showing the state of the cutting edge part of the multi-flute endmill of the present invention when the number of cutting edges is 15 when viewed from the end surface side in the tool axis direction.

FIG. 9 shows the state of the cutting edge part 3 of a so-called 10-edge multi-flute endmill 11 of the present invention when the number of cutting edges is 10 when viewed from the end surface side in the tool axis O direction. FIG. 10 shows the state of the cutting edge part 3 of a so-called 15-edge multi-flute endmill 12 of the present invention when the number of cutting edges is 15 when viewed from the end surface side in the tool axis O direction. The advantageous effects of the present invention can be achieved in both the case of 10 cutting edges and the case of 15 cutting edges.

In order to perform high-efficiency finishing processing on a curved surface part of an impeller or the like by mounting the multi-flute endmill 1 (11, 12) of the present invention to a 3-axis or 5-axis NC processing machine, the edge diameter L1 at the starting point of formation of the peripheral cutting edge 4 is preferably set to a range of from 10 mm to 30 mm. The reason for this is as follows.

If the edge diameter L1 is 10 to 30 mm, it is possible to achieve a volume (V) of the chip pocket CP of 25 mm³ or more to 120 mm³ or less even if the number of cutting edges is increased to 6 or more to 30 or less in order to carry out cutting at high efficiency. However, if the edge diameter L1 is less than 10 mm and the number of cutting edges is increased, it becomes difficult to secure a volume (V) of the chip pocket CP of 25 mm³ or more. Further, if the edge diameter L1 exceeds 30 mm, when the volume (V) of the chip pocket CP is set to 25 mm³ or more to 120 mm³ or less, the opening angle b of the gash becomes extremely narrow, and this may interfere with chip discharge.

In the multi-flute endmill 1 of the present invention, a more preferable range of the edge diameter L1 is from 15 mm to 25 mm.

In high-feed, high-efficiency cutting of an impeller using the multi-flute endmill 1 of the present invention, by setting the volume (V) of the chip pocket CP to a range of from 25 mm³ or more to 120 mm³ or less, the generated chips can be discharged smoothly even in the case of high-feed, high-efficiency processing. The reason for this is as follows.

If the volume (V) of the chip pocket CP is less than 25 mm³, when performing high-efficiency cutting, the chips formed mainly by the corner R edge 5 are not discharged smoothly, and defects or chipping of the cutting edges due to chip clogging occurs. On the other hand, if the volume (V) of the chip pocket CP exceeds 120 mm³, when the number of cutting edges is increased, it is difficult to secure rigidity because the overall volume as a tool decreases, and thus defects and chipping occurs due to impacts during cutting. If the number of cutting edges is decreased to prevent a decrease in the overall volume as a tool, the overall feed rate Vf [mm/min] until completion of finishing processing decreases, and thus high-efficiency cutting which is an object of the present invention cannot be realized.

In the present invention, the volume (V) of the chip pocket CP is preferably in a range of from 35 mm³ or more to 100 mm³ or less, and more preferably from 45 mm³ or more to 70 mm³ or less.

In setting the volume (V) of the chip pocket CP per one cutting edge to a range of from 25 mm³ or more to 120 mm³ or less, the chip pocket CP is formed so as to make the gash 7 and the flute 8 that exist on the forward side in the rotation direction R of the corner R edge 5 as large as possible. In detail, the opening angle b of the gash 7 shown in FIG. 3 is set to be as large as possible without compromising the rigidity, or the radial direction length of the rake face 4a of the peripheral cutting edge 4 is formed to be as long as possible. The "radial direction length of the rake face 4a of the peripheral cutting edge 4" refers to the length when the rake face 4a of the peripheral cutting edge 4 shown in FIG. 4 is measured in the vertical direction relative to the tool axis O (the length that connects in the radial direction of the tool two straight lines that are parallel to the tool axis O direction and respectively pass through the intersection point of the step part 10 and the rake face 5a of the corner R edge 5 and the peripheral cutting edge 4 formation starting point P1). This length is preferably 15 to 35% of the edge diameter L1 of the multi-flute endmill at the starting point of formation of the peripheral cutting edges.

If the radial direction length of the rake face 4a of the peripheral cutting edge 4 is less than 15% of the edge diameter L1, it is recognized that there is a tendency for chip clogging to occur easily in the flute 8, and if it exceeds 35% of the edge diameter L1, it is recognized that there is a tendency for chipping to occur easily at the corner R edge 5. Thereby, the space near the corner R edge 5 is large, and the chips can be more stably carried to the flute 8 even when performing high-efficiency cutting.

It is also preferable to increase the radial direction length of the rake face 4a of the peripheral cutting edge 4 as the number of cutting edges increases. As an example of specific numerical values, if the number of cutting edges is 10, the radial direction length of the rake face 4a of the peripheral cutting edge 4 is 15 to 20% of the edge diameter L1. If the number of cutting edges is 12, it is 20 to 25% of the edge diameter L1. If the number of cutting edges is 15, it is 25 to 30% of the edge diameter L1.

The volume (V) of the chip pocket CP of the multi-flute endmill 1 of the present invention was calculated by the following method. Using a non-contact 3-D measurement system (product name: RexcanIII made by Solutionix), the surface (including the cutting edge part) of a sample multi-flute endmill 1 was successively 3-D measured to produce a 3-D CAD model of the multi-flute endmill of the present invention. Next, from the 3-D CAD model, the volume of the space consisting of the sum of the gash 7 formed between adjacent cutting edges and the flute 8 that is continuous with the gash 7 was found as the volume (V) of the chip pocket CP per one cutting edge.

Other features regarding the structure of the multi-flute endmill 1 of the present invention will be explained below.

In the embodiment of the multi-flute endmill 1 of the present invention shown in FIG. 2, the peripheral cutting edge 4 is formed to be inclined downward in the direction of the tool axis O, or in other words to be inclined from the forward side toward the rearward side in the rotation direction R from the end surface (tip 1a) side to the shank 2 of the multi-flute endmill 1. The inclination angle $\alpha$ (refer to FIG. 2) of the peripheral cutting edge 4 is preferably set to a range of from 5° or more to 10° or less. The reason that the inclination angle $\alpha$ is set to the angle range described above will be explained below.

When processing an impeller having a curved surface with a 3-axis or 5-axis NC machine tool while tilting the tool axis O of the multi-flute endmill 1, and particularly when cutting the recessed surface of the surface of the impeller, the processing is carried out while controlling the tilt of the multi-flute endmill 1 retained on the NC machine tool. Herein, if the inclination angle $\alpha$ of the peripheral cutting edge 4 is set to less than 5°, interference between the peripheral cutting edge 4 and the impeller may occur due to the tilt of the multi-flute endmill 1, and thus penetration (over-cutting) of the peripheral cutting edge 4 may occur on the surface of the impeller.

On the other hand, if the inclination angle $\alpha$ of the peripheral cutting edge 4 exceeds 10°, the diameter of the cutting edge part 3 on the tip 1a side of the multi-flute endmill 1 becomes small, and thus the lengths of the cutting edges such as the corner R edge 5, the end cutting edge 6, and the like become short. Thereby, the cutting edge tip strength of the cutting edges decreases. Further, since the volume (V) of the chip pocket CP per one cutting edge decreases, when performing high-feed cutting, chip clogging easily occurs and there is a danger that chipping of the cutting edges or jamming of the chips may occur. Therefore, the inclination angle $\alpha$ of the peripheral cutting edge 4 is preferably set to a range of from 5° or more to 10° or less.

In this way, in the multi-flute endmill 1 in which the inclination angle $\alpha$ by which the peripheral cutting edge 4 is inclined downward toward the direction of the tip 1a side relative to the tool axis O is set to a range of from 5° or more to 10° or less, as shown in FIG. 2, an edge diameter L2 at the connecting part of the peripheral cutting edge 4 and the corner R edge 5 is smaller than the edge diameter L1 at the starting point of formation of the peripheral cutting edge 4.

As described above, the rake face 6a of the end cutting edge 6 and the gash face 7a constitute the gash 7 formed in the outer peripheral direction of the cutting edge part 3 from the vicinity of the tool axis O. As shown in FIG. 4, in the multi-flute endmill 1 of the present invention, the angle $\beta$ of the gash 7, which is the angle formed by the straight line that intersects the tool axis O and the border line 9 of the rake face 6a of the end cutting edge 6 and the gash face 7a, is preferably set to a range of from 15° or more to 45° or less.

As one feature of the multi-flute endmill 1 of the present invention, the reason that the angle $\beta$ of the gash 7 is preferably set to a range of from 15° or more to 45° or less is as follows.

Conventionally, in the cutting of alloy materials that are difficult to cut such as a nickel-based super-heat-resistant alloy, in order to avoid problems with chip discharge in advance, an endmill including 4 or less cutting edges was generally used. This fact can be said to suggest the existence of a conventionally unsolved problem in which the large amount of chips generated during high-feed cutting could not be smoothly discharged and thus high-feed cutting could not be performed. In response to this problem, if the number of cutting edges of the endmill was simply increased to 6 or more and the feed rate Vf was increased, the volume (capacity) of the chip pocket that collects chips would decrease in accordance with the increase in the number of cutting edges, and thus a deficiency would arise in that chip clogging would be caused. In particular, in the finishing processing of an impeller, since cutting is performed by tilting the tool axis O of the endmill, it is conceivable that the chips would accumulate in the vicinity of the tool axis O of the end cutting edge 6 in the locations of cutting.

Given the above circumstances, in the finishing cutting of an impeller, if the angle $\beta$ of the gash 7 is set to less than 15°, the volume (V) of the chip pocket CP becomes small which leads to jamming of the chips flowing in the vicinity of the tool axis O of the multi-flute endmill 1, and thus chipping of the cutting edges easily occurs. Therefore, it is preferable to set the angle $\beta$ of the gash 7 to 15° or more.

Further, if the angle $\beta$ of the gash 7 exceeds 45°, the volume (V) of the chip pocket CP is sufficiently secured, but the strength of the corner R edge 5 is insufficient. Thus, the corner R edge cannot withstand the cutting resistance during high-feed processing and chipping of the corner R edge 5 occurs easily. Therefore, it is preferable to set the angle $\beta$ of the gash 7 to 45° or less. Ultimately, it is preferable to set the angle $\beta$ of the gash 7 to a range of from 15° or more to 45° or less.

Next, another feature of the multi-flute endmill 1 of the present invention will be explained referring to FIG. 3.

As shown in FIG. 3, when viewing the multi-flute endmill 1 in the tool axis O direction from the tip 1a side, an angle created by the end cutting edge 6 and a ridge line on the rearward side in the rotation direction R at the flank 6b of the end cutting edge 6 (a border line of the gash face 7a and the flank 6b of the end cutting edge 6) is a width angle a of the flank 6b of the end cutting edge 6. An angle created by the ridge line on the rearward side in the rotation direction R at the flank 6b of the end cutting edge 6 and a ridge line on the forward side in the rotation direction R of an end cutting edge 6 that is adjacent thereto on the rearward side in the rotation direction R is a gash 7 opening angle b. In this case, the end cutting edges 6 and the flank 6b of the end cutting edge 6 are preferably formed and arranged such that the gash 7 opening angle b is in the range of from 1.5 times or more to 3 times or less of the width angle a of the flank 6b of the end cutting edge 6.

The width angle a of the flank 6b of the end cutting edge 6 indicates the width angle in a plan view of the flank 6b of the end cutting edge 6 from the tool axis O. The width angle a of the flank 6b of the end cutting edge 6 is appropriately set in accordance with the edge diameter and number of cutting edges of the multi-flute endmill 1. For example, it is appropriate to set the width angle a of the flank 6b of the end cutting edge 6 to 10° to 30° when the number of cutting edges is 8, to 8° to 24° when the number of cutting edges is 10, and to 6° to 20° when the number of cutting edges is 12.

The gash 7 opening angle b indicates the opening angle from the tool axis O of the gash 7, and it is found by subtracting the value of the width angle a of the flank of the end cutting edge from the numerical value of 360° divided by the number of cutting edges. The gash 7 opening angle b is preferably set to, for example, 35° to 15° when the number of cutting edges is 8, to 28° to 12° when the number of cutting edges is 10, and to 24° to 10° when the number of cutting edges is 12. It is important to set the gash 7 opening angle b so that the breadth of the V-shaped gash 7 can be secured when measured in the rotation direction R within a scope that does not compromise the rigidity of the cutting edges, particularly the end cutting edge 6 and the corner R edge 5.

In the multi-flute endmill 1 of the present invention, for example, if the edge diameter is 30 mm and the number of cutting edges is 10, the width angle a of the flank 6b of the end cutting edge 6 is set to approximately 12° and the gash 7 opening angle b is set to approximately 24°.

The reason that it is preferable to set the gash 7 opening angle b to from 1.5 times or more to 3 times or less of the width angle a of the flank 6b of the end cutting edge 6 is explained below.

If the gash 7 opening angle b is set to less than 1.5 times of the width angle a of the flank 6b of the end cutting edge 6, the cutting edge tip rigidity of the cutting edges can be improved, but the chip pocket CP becomes small when performing high-efficiency processing in which the cutting and feed rates are raised. In other words, since the gash 7 opening angle b is small, the chips cannot be carried efficiently to the flute 8, and jamming of the chips occurs. Thus, it is preferable to set the gash 7 opening angle b to 1.5 times or more of the width angle a of the flank 6b of the end cutting edge 6.

If the gash 7 opening angle b is set to more than 3 times of the width angle a of the flank 6b of the end cutting edge 6, the cutting edge tip strength of the end cutting edge 6 and the corner R edge 5 is insufficient, and in particular, chipping occurs at the corner R edge 5, which is the main cutting edge in the processing of an impeller. Thus, it is preferable to set the gash 7 opening angle b to 3 times or less of the width angle a of the flank of the end cutting edge. Accordingly, it is preferable to set the gash 7 opening angle b to from 1.5 times or more to 3 times or less of the width angle a of the flank of the end cutting edge.

Figure 5:
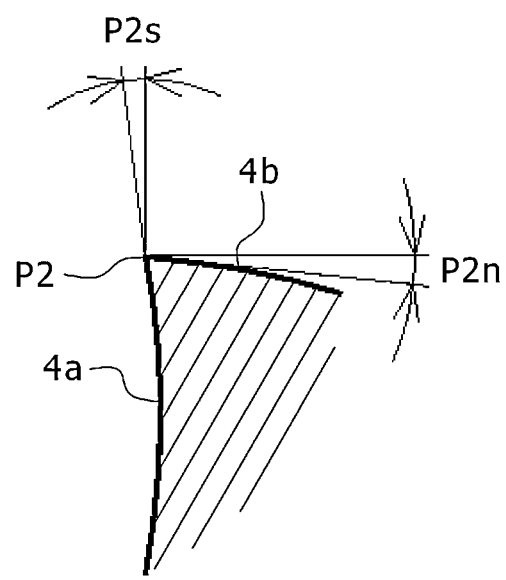
FIG. 5 is a cross-section view along line C-C in FIG. 4 showing a relationship between a rake angle P2s and a flank angle P2n at a connecting part P2.

Next, another feature of the multi-flute endmill 1 of the present invention will be explained referring to FIG. 5. FIG. 5 is a cross-section view along line C-C in FIG. 4 showing a relationship between a rake angle P2s and a flank angle P2n at the connecting part P2. The cross-section along line C-C is a cross-section perpendicular to the axis at the connecting point P2 of the peripheral cutting edge 4 and the corner R edge 5. A cross-section perpendicular to the axis indicates a cross-section when cut in a direction that is perpendicular to the tool axis O. In FIG. 5, P2s is a rake angle at the connecting point P2 of the peripheral cutting edge 4 and the corner R edge 5, and P2n is a flank angle at the connecting point P2 of the peripheral cutting edge 4 and the corner R edge 5. In the multi-flute endmill 1 of the present invention, the rake angle P2s in the cross-section perpendicular to the axis at the connecting point P2 of the peripheral cutting edge 4 and the corner R edge 5 is preferably set to a range of from 3° or more to 10° or less.

The reason that the rake angle P2s in the cross-section perpendicular to the axis at the connecting point P2 of the peripheral cutting edge 4 and the corner R edge 5 is preferably set to a range of from 3° or more to 10° or less is explained below.

If the rake angle P2s in the cross-section perpendicular to the axis at the connecting point P2 of the peripheral cutting edge 4 and the corner R edge 5 is less than 3°, welding at the cutting edge tip of the cutting edges occurs due to insufficient sharpness, and a large amount of chipping occurs due to jamming when the material to be cut is cut by the next corner R edge 5. Thus, the rake angle P2s is preferably set to 3° or more.

If the rake angle P2s exceeds 10°, the sharpness is sufficient, but chipping occurs easily due to insufficient cutting edge tip strength. Thus, the rake angle P2s is preferably set to 10° or less. Accordingly, the rake angle P2s is preferably set to a range of from 3° or more to 10° or less.

Next, another feature of the multi-flute endmill 1 of the present invention will be explained. This feature is found in setting the flank angle in a cross-section in a direction that is orthogonal to tangent lines at an arbitrary point on the end cutting edge 6, corner R edge 5, and peripheral cutting edge 4 (an edge-orthogonal cross-section) to be constant for each of the end cutting edge 6, the corner R edge 5, and the peripheral cutting edge 4. The edge-orthogonal cross-section means a cross-section when cut in a direction that is perpendicular to a tangent line created upon drawing a tangent line that passes through an arbitrary point on each of the cutting edges.

Figure 6:
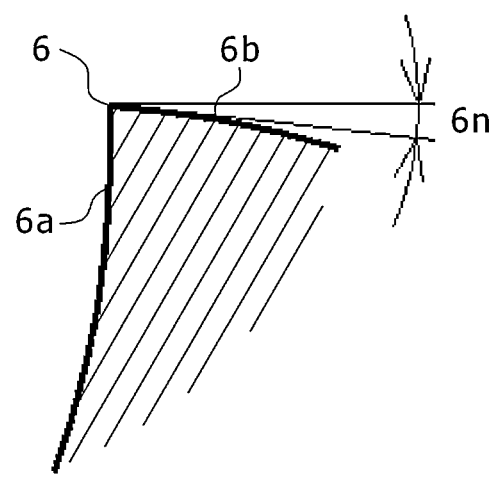
FIG. 6 is a cross-section view along line A-A in FIG. 4.
Figure 7:
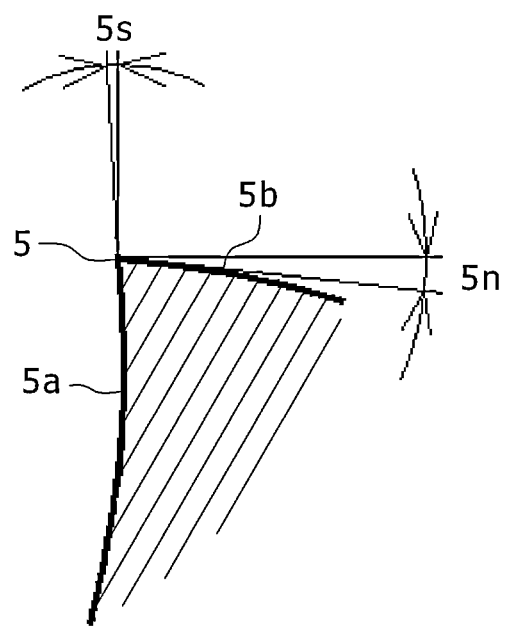
FIG. 7 is a cross-section view along line B-B in FIG. 4 showing a relationship between a flank angle 5n and a rake angle 5s at the corner R edge.
Figure 8:
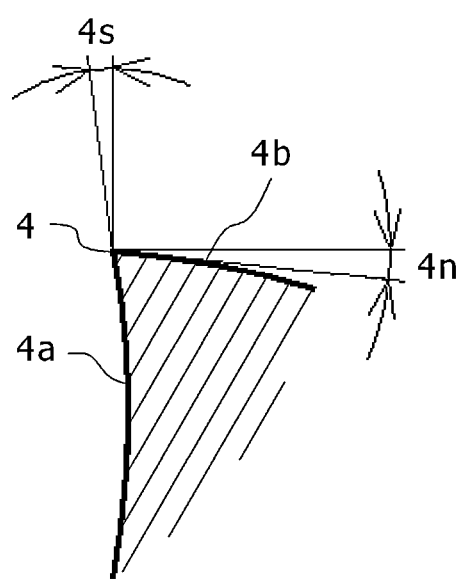
FIG. 8 is a cross-section view along line D-D in FIG. 4 showing a relationship between a flank angle 4n and a rake angle 4s at the peripheral cutting edge.

FIG. 6 is a cross-section view along line A-A in FIG. 4. FIG. 6 illustrates a flank angle 6n in the edge-orthogonal cross-section of the end cutting edge 6 when viewed at a cross-section in a direction orthogonal to a tangent line on the end cutting edge 6 (a cross-section along line A-A shown in FIG. 4). FIG. 7 is a cross-section view along line B-B in FIG. 4 showing the relationship between a flank angle 5n and a rake angle 5s of the corner R edge 5. FIG. 7 shows the flank angle 5n in the edge-orthogonal cross-section of the corner R edge 5 and the rake angle 5s in the edge-orthogonal cross-section of the corner R edge when viewed at a cross-section in a direction that is orthogonal to a tangent line at an arbitrary point on the corner R edge 5 (a cross-section along line B-B shown in FIG. 4). FIG. 8 is a cross-section view along line D-D in FIG. 4 showing the relationship between a flank angle 4n and a rake angle 4s of the peripheral cutting edge 4. FIG. 8 shows the flank angle 4n in the edge-orthogonal cross-section of the peripheral cutting edge 4 and the rake angle 4s in the edge-orthogonal cross-section of the peripheral cutting edge 4 when viewed at a cross-section in a direction that is orthogonal to a tangent line at an arbitrary point on the peripheral cutting edge 4 (a cross-section along line D-D shown in FIG. 4). In the multi-flute endmill 1 of the present invention, the values of the flank angles 4n, 5n, and 6n are set to be constant. For example, the flank angles 4n, 5n, and 6n are all an identical 6°.

The feature related to the flank angles described above, or in other words the reason for setting the flank angles 4n, 5n, and 6n at a cross-section (edge-orthogonal cross-section) in a direction that is orthogonal to tangent lines at arbitrary points on the peripheral cutting edge 4, the corner R edge 5, and the end cutting edge 6 so that they are all constant is explained below.

When performing finishing processing of an impeller with a 3-axis or 5-axis NC machine tool, in order to improve the processing efficiency by controlling the tool axis O of the endmill and the material to be cut with an NC program so that they move simultaneously, the corner R edge 5 is used as the main cutting edge and the end cutting edge 6 and the peripheral cutting edge 4 are also used. Therein, if the connecting point of the end cutting edge 6 and the corner R edge 5 and the flank angles of the corner R edge 5 and the peripheral cutting edge 4 change, a level difference will be generated there, and this may conceivably have a negative influence on the finishing surface of the material to be cut. Therefore, it is preferable to set the flank angles $4n$, $5n$, and $6n$ at the edge-orthogonal cross-section of the peripheral cutting edge 4, the corner R edge 5, and the end cutting edge 6 so that they are all constant.

Next, another feature of the multi-flute endmill 1 of the present invention will be explained. This feature is found in setting a length of the cutting edge formed from the tip $1a$ side toward the direction of the tool axis O of the multi-flute endmill 1 shown in FIGS. 1 and 2, or in other words an edge length L3, which is the length from the tip $1a$ side to the peripheral cutting edge 4 formation starting point P1 of the cutting edge part 3 relative to the tool axis O direction, to a range of from 30% or more to 60% or less of the edge diameter L1 at the peripheral cutting edge 4 formation starting point P1.

In the feature described above, the reason that the edge length L3 is preferably set to from 30% or more to 60% or less of the edge diameter L1 at the peripheral cutting edge 4 formation starting point is explained below.

When performing finishing processing on an impeller having a curved surface with a 3-axis or 5-axis NC processing machine, NC control to simultaneously move the tool axis O of the multi-flute endmill 1 and the material to be cut is performed. Therefore, there is a danger that a portion that interferes with the material to be cut may be generated in the peripheral cutting edge 4. In the finishing processing of an impeller, the cutting is performed using mainly the corner R edge 5 of the multi-flute endmill 1. In this case, if the edge length L3 is less than 30% of the edge diameter L1 at the peripheral cutting edge 4 formation starting point, the edge length L3 becomes short and thus there are cases in which the shank 2 in which cutting edges are not formed causes interference with the material to be cut. Thus, the edge length L3 is preferably set to 30% or more of the edge diameter L1.

On the other hand, if the edge length L3 exceeds 60% of the edge diameter L1 at the peripheral cutting edge 4 formation starting point, compared to the shank 2, the chip pocket CP in the cutting edge part 3 in which the gash 7 and the flute 8 that is in communication with the gash 7 and the like are formed becomes too large. Thus, the rigidity of the cutting edge part 3 decreases, and a deficiency arises in that chattering occurs if high-feed cutting is performed. Thus, the edge length L3 is preferably set to 60% or less of the edge diameter L1.

Next, another feature of the multi-flute endmill 1 of the present invention will be explained. This feature is found in setting a curvature radius r1 of an R-shaped part of the corner R edge (refer to FIG. 4) to a range of from 10% or more to 20% or less of the edge diameter L1 at the peripheral cutting edge 4 formation starting point. The reason that the curvature radius r1 is preferably set to the range described above is explained below.

When performing finishing cutting on an impeller with a 3-axis or 5-axis NC tool machine, the corner R edge 5 is mainly used. Further, in order to perform high-efficiency, i.e. high-speed and high-feed cutting, the cutting edge tip strength of the corner R edge 5 becomes a problem. Setting the curvature radius r1 of the R-shaped part of the corner R edge 5 to be large increases the cutting edge tip strength of the corner R edge 5 and enables cutting at a high cutting depth. If the curvature radius r1 is set to be less than 10% of the edge diameter L1 at the peripheral cutting edge 4 formation starting point, when performing processing at a high cutting depth, the cutting edge tip strength is insufficient and thus chipping occurs at the corner R edge 5.

On the other hand, if the curvature radius r1 of the R-shaped part of the corner R edge exceeds 20% of the edge diameter L1 at the peripheral cutting edge 4 formation starting point, the R shape of the corner R edge 5 becomes too large. Thus, when cutting the material to be cut, the cutting edge length along which the corner R edge 5 contacts the material to be cut is long and the cutting resistance increases, and this causes chipping at the cutting edges. Therefore, the curvature radius r1 is preferably set to a range of from 10% or more to 20% or less of the edge diameter L1.

In the multi-flute endmill 1 shown in FIGS. 2 and 3 and the like, coolant holes for supplying a coolant (liquid) during cutting of the material to be cut are not illustrated. However, it is preferable to provide one or a plurality of coolant holes on the tip $1a$ side. A coolant is supplied for the following purposes: to cool the cutting edges during cutting, to smoothly discharge chips generated during cutting to the outside via the flute 8 from the gash 7 formed between adjacent cutting edges, and to prevent the chips from adhering (welding) to the cutting edges.

When performing high-feed cutting on an impeller, cooling of the cutting edges and good discharge of generated chips are important. Thus, it is preferable to provide at least 3 coolant holes on the tip $1a$ side of the multi-flute endmill 1. The locations at which the coolant holes are provided are suitably, for example, the gash face $7a$ shown in FIG. 3, or the flank $6b$ of the end cutting edge 6, or the vicinity thereof. During cutting, coolant is supplied from the 3-axis or 5-axis NC processing machine, and sprayed from the plurality of coolant holes exposed on the surface via the coolant holes drilled in the tool axis O direction on the inside of the shank 2.

(Summary of Method for Manufacturing the Multi-Flute Endmill)

Next, a summary of a method for manufacturing the multi-flute endmill 1 of the present invention will be explained. The multi-flute endmill 1 of the present invention is a solid-type endmill manufactured by a known manufacturing method from a powder of a cemented carbide of which WC (tungsten carbide) is a main component. The molded body of the multi-flute endmill 1 obtained by molding the powder is inserted into a sintering furnace and subjected to sintering to heat it to a predetermined temperature. The obtained sintered body of the multi-flute endmill 1 is then formed by cutting a predetermined number of cutting edges in the cutting edge part 3, i.e. the peripheral cutting edges 4, the corner R edges 5, the end cutting edges 6, the rake faces $4a$, $5a$, and $6a$ and the flanks $4b$, $5b$, and $6b$ of each cutting edge, and the gash faces 7 and the flutes 8, with a cutting device that uses a diamond grind stone or the like. Further, coolant holes are drilled in the tool axis O direction in the inside of the multi-flute endmill 1 (shank 2) to provide a plurality of coolant holes on the tip $1a$ side.

To the multi-flute endmill 1 in which the processing of the peripheral cutting edges 4, corner R edges 5, and end cutting edges 6 and the like in the cutting edge part 3 by the cutting device has been completed, a hard coating having a thickness of approximately 3 μm is applied by, for example, a PVD method on at least the entire surface of the end cutting edge 3. As a hard coating to be applied on the multi-flute endmill 1 of the present invention, an AlCr-based hard coating such as an AlCrN film is suitable. The reason for this is as follows.

In general, when cutting a material (material to be cut) of a difficult-to-cut alloy, welding of the chips to the cutting edges and the like is a major problem. In order to prevent chips generated during cutting from welding to the cutting edges and the like, it is necessary to apply a hard coating that has as low friction coefficient as possible to the cutting edges and the like. In a difficult-to-cut alloy material, since a higher cutting heat is generated compared to a normal alloy steel, it is necessary to apply a hard coating that has excellent heat resistance. Further, since cutting of an impeller is intermittent cutting, it is necessary to apply a hard coating that has good impact resistance.

As a hard coating to be applied to an endmill, TiAl-based hard coatings have been conventionally used. However, TiAl-based hard coatings have low heat resistance and a high friction coefficient, and thus they have poor stability and a high friction coefficient, although the heat resistance is not a problem. Therefore, there has been a problem with such coatings in that the chips easily weld. In contrast, AlCr-based hard coatings have heat resistance and a low friction coefficient, and thus they enable stable cutting. Therefore, in the multi-flute endmill 1 of the present invention, it is preferable to apply an AlCr-based hard coating, for example a hard coating consisting of AlCrSiN, at a thickness of approximately 3 μm to at least the entire surface of the cutting edge part 3.

EXAMPLES

Hereinafter, the present invention will be explained based on examples, but the present invention is not limited by the following examples.

A sample of the multi-flute endmill made of cemented carbide of the present invention was created and used to perform cutting on a material to be cut. Two types of cutting experiments (Experimental Example 1 and Experimental Example 2) were performed in order to confirm the condition of wear and the occurrence of chipping on the cutting edges of the multi-flute endmill after processing. The results of these cutting experiments will be explained below.

Experimental Example 1

As described above, one feature of the multi-flute endmill 1 of the present invention is that the rake face 5a of the corner R edge 5 that forms a convex curved surface is provided to the corner R edge 5. In Experimental Example 1, a sample of an endmill of an example of the present invention (Present Invention Example 1) in which rake faces 5a are provided to the corner R edges 5 was prepared. A block material (aging treated) of Inconel (registered trademark) 718, which is a nickel-based heat-resistant alloy, was attached to 3-axis vertical machining center such that the inclination angle is 10°, and pull-up processing was performed on the inclined surface (inclination angle of 10°) of the block material. The wear condition of the cutting edges was visually observed when the cumulative cutting distance reached 45 m.

In Present Invention Example 1 as explained above, the rake face 5a of the corner R edge 5 and the rake face 4a of the peripheral cutting edge 4 are formed to create convex gently curved surfaces, and the rake face 5a and the rake face 4a are continuous with the rake face 6a via the step part 10 so as to be positioned more toward the shank 2 side than the tip 1a side on the rearward side in the rotation direction R relative to the rake face 6a of the end cutting edge 6 (refer to FIG. 4). For the purpose of comparison with the endmill of this present invention example, a sample of an endmill (Comparative Example 1) made of cemented carbide in which the rake face 5a is not provided to the corner R edge 5 and the rake face 4a of the peripheral cutting edge 4 is made into the rake face 5a of the corner R edge 5 as shown in FIG. 19 was prepared.

The specification of the endmills of Present Invention Example 1 and Comparative Example 1 prepared in order to conduct Experimental Example 1 were as follows: the total length in the tool axis O direction was 125 mm, the edge diameter L2 of the multi-flute endmill at the connecting part of the peripheral cutting edge 4 and the corner R edge 5 was 19 mm, and the shank diameter (edge diameter L1 of the multi-flute endmill at the peripheral cutting edge formation starting point) was 20 mm. Also, a hard coating having a thickness of 3 μm consisting of Al—Cr—Si—N was applied by a PVD method to the entire surface of the cutting edge part 3 of the sample endmills of Present Invention Example 1 and Comparative Example 1.

The specifications of the dimensions (except for the hard coating) of the sample endmills of Present Invention Example 1 and Comparative Example 1 are shown in Table 1. The flute length h shown in Table 1 indicates a length from the tip 1a side to the end of the flute 8 of the multi-flute endmill 1 when measured in a direction parallel to the tool axis O as shown in FIG. 4. The flute lengths h of all of the flutes 8 are the same. In the sample multi-flute endmills of Present Invention Example 1 and Comparative Example 1, no coolant holes were provided and water-soluble coolant liquid was supplied from the outside.

TABLE 1

| Specification Item | Present Invention Example 1 | Comparative Example 1 |
| --- | --- | --- |
| Number of cutting edges | 10 | (same as left) |
| Inclination angle α of peripheral cutting edge | 8° | (same as left) |
| Curvature radius r1 of corner R edge | 2 mm | (same as left) |
| Deflection angle of flute | 30° | (same as left) |
| Rake angle of connecting part of corner R edge and peripheral cutting edge (cross-section perpendicular to axis) | 7° | 0° (rake face 5a is not provided) |
| Flank angle of peripheral cutting edge (edge-orthogonal cross-section) | 6° | (same as left) |
| Flank angle of corner R edge (edge-orthogonal cross-section) | 6° | (same as left) |
| Flank angle of end cutting edge (edge-orthogonal cross-section) | 6° | (same as left) |
| Angle β of end gash | 30° | (same as left) |
| Width angle a of flank of end cutting edge | 8° | (same as left) |
| Gash opening angle b | 28° | (same as left) |
| b/a | 3.5 | (same as left) |
| Volume (V) of chip pocket per one cutting edge | 70 mm$^3$ | (same as left) |
| Edge length L3 | 6 mm | (same as left) |
| Flute length h | 9 mm | (same as left) |

TABLE 1-continued

| Specification Item | Present Invention Example 1 | Comparative Example 1 |
|---|---|---|
| Angle φ | 20° | (same as left) |
| Inclination angle ξ | 33° | (same as left) |
| Inclination angle η | 6° | (same as left) |
| Width of gash bottom surface | 0.25 mm | (same as left) |

Figure 12:
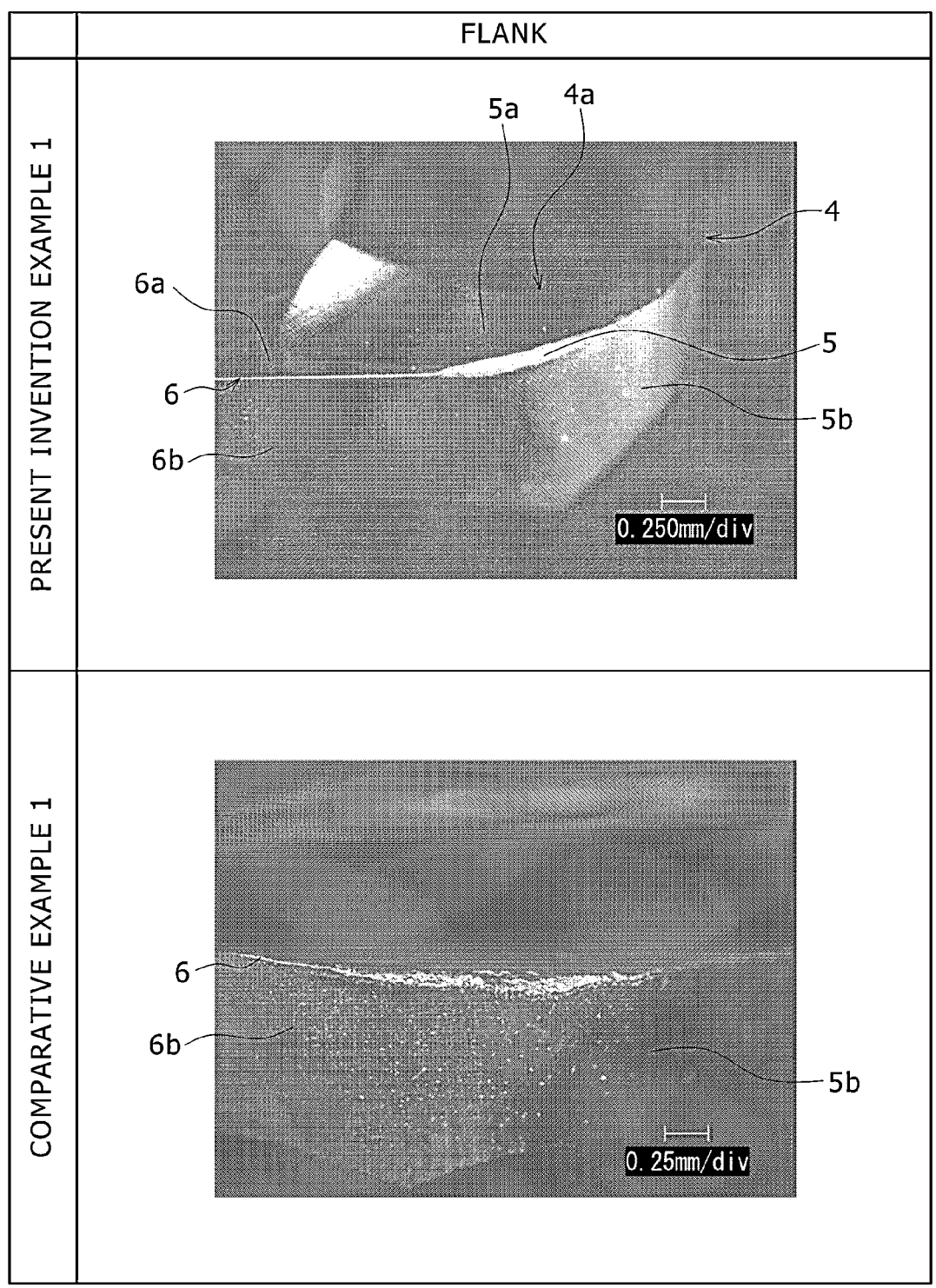
FIG. 12 shows pictures illustrating the condition of wear of the flanks of the cutting edges after conducting the cutting experiment of Experimental Example 1 using the multi-flute endmill of Present Invention Example 1 and the multi-flute endmill according to Comparative Example 1.
Figure 13:
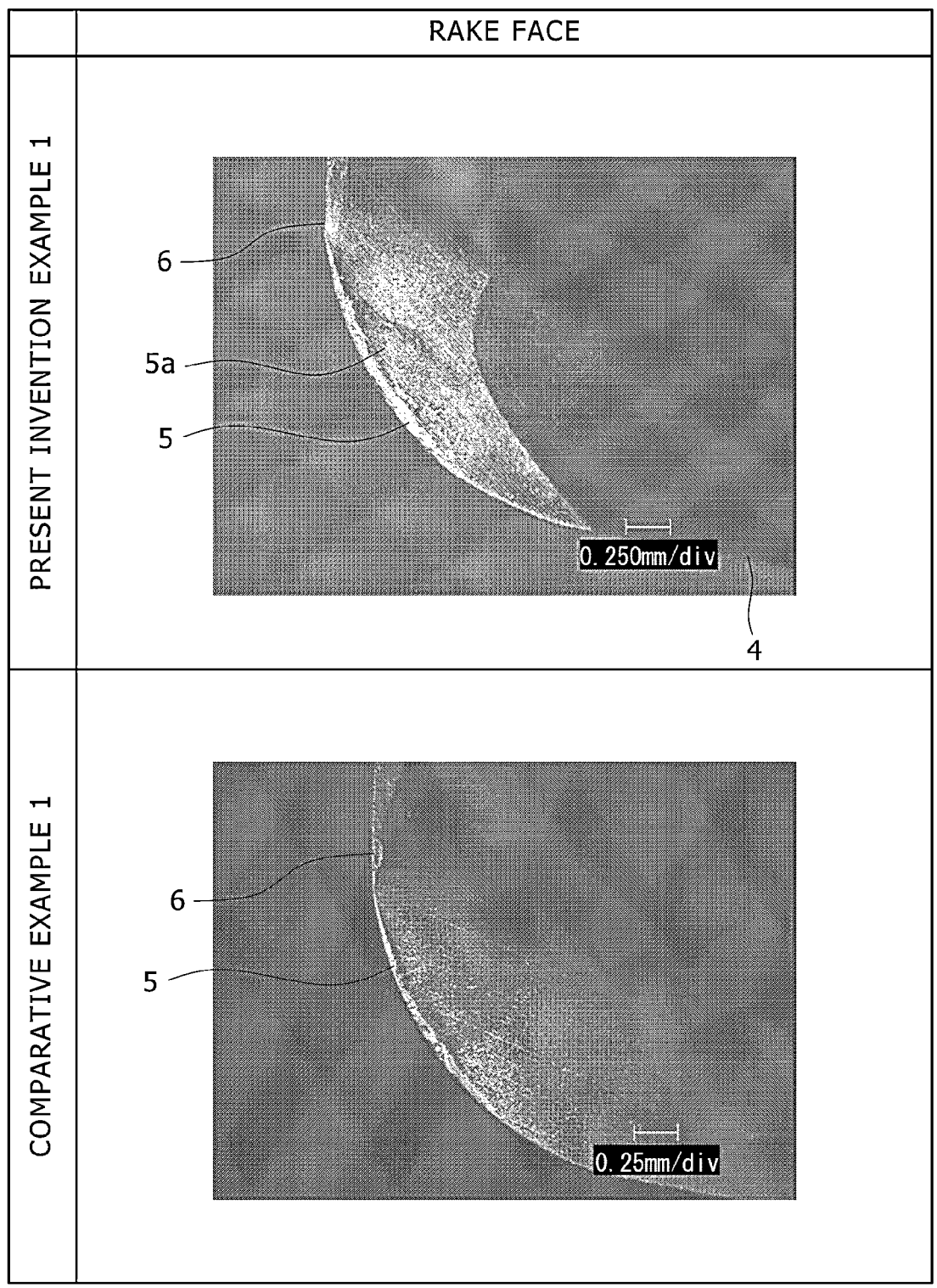
FIG. 13 shows pictures illustrating the condition of wear of the rake faces of the cutting edges after conducting the cutting experiment of Experimental Example 1 using the multi-flute endmill of Present Invention Example 1 and the multi-flute endmill according to Comparative Example 1.

In the high-feed cutting of the material to be cut using a 3-axis vertical machining center, the cutting conditions that were set are as follows for the endmills of both Present Invention Example 1 and Comparative Example 1.

cutting speed Vc: 80 m/min
feed rate Vf: 1880 mm/min
feed amount per one cutting edge fz: 0.14 mm/t
axial direction cutting depth ap: 1.0 mm
radial direction cutting depth ae: 1.8 mm
tool protruding amount: 60 mm
cooling method during cutting: supplying water-soluble cooling liquid from the outside The results of the cutting experiment according to Experiment Example 1 are shown in FIGS. 12 and 13. FIG. 12 shows pictures illustrating the condition of wear of the flanks of the cutting edges after conducting the cutting experiment of Experimental Example 1 using the multi-flute endmill of Present Invention Example 1 and the multi-flute endmill of Comparative Example 1. FIG. 13 shows pictures illustrating the condition of wear of the rake faces of the cutting edges after conducting the cutting experiment of Experimental Example 1 using the multi-flute endmill of Present Invention Example 1 and the multi-flute endmill of Comparative Example 1.

In FIG. 12, the pictures of the flanks of Present Invention Example 1 and Comparative Example 1 were photographed from the side of the flank 6b of the end cutting edge 6. In FIG. 13, the pictures of the rake faces of Present Invention Example 1 and Comparative Example 1 were photographed from the side of the rake face 5a of the corner R edge of the present invention example. Further, the numerical values "0.25 mm/div" and the like displayed in the bottom right side of the pictures indicate the scale of the picture (length per scale graduation).

As is clear from FIGS. 12 and 13, in Present Invention Example 1 in which the rake face 5a is provided to the corner R edge 5, the average wear width (VB value) of the flank 5b and the rake face 5a of the corner R edge 5 was 0.056 mm, and no wear that would influence the processing precision was found.

On the other hand, in the multi-flute endmill of Comparative Example 1, it was found that chipping occurred in the flank 5b of the corner R edge 5 as shown in FIG. 12. From the results of Experimental Example 1 described above, it was confirmed that if the rake face 5a is provided to the corner R edge 5 of the multi-flute endmill, the cutting quality on the material to be cut can be improved and the occurrence of chipping on the cutting edges can be suppressed.

Experimental Example 2

Next, samples of multi-flute endmills made of an ultra-hard alloy of Present Invention Example 2 and Comparative Example 2 in which the number of cutting edges, the width angle a of the flank 6b of the end cutting edge 6, and the gash 7 opening angle b are different, or in other words in which the volume (V) of the chip pocket CP per one cutting edge is different, were prepared. The prepared endmills were attached to a 3-axis vertical machining center to perform high-feed cutting, and a cutting experiment to confirm the conditions of wear and occurrence of chipping on the cutting edges was conducted. The specifications of the multi-flute endmills of Present Invention Example 2 and Comparative Example 2 used in Experimental Example 2 are shown in Table 2. Comparative Example 2 is an endmill having a cutting edge structure similar to that of the multi-flute endmill disclosed in Patent Document 3. In the sample multi-flute endmills of Present Invention Example 2 and Comparative Example 2, no coolant holes were provided and water-soluble coolant liquid was supplied from the outside.

As shown in Table 2, in the multi-flute endmill 1 of Present Invention Example 2, the number of cutting edges was set to 12 and the volume (V) of the chip pocket CP per one cutting edge was set to 45 $mm^3$. On the other hand, in Comparative Example 2, the cutting edge structure was made similar to that of the multi-flute endmill disclosed in FIG. 4 of Patent Document 3. Thus, the number of cutting edges was 15, which is greater than that in Present Invention Example 2, and the volume (V) of the chip pocket CP per one cutting edge was 23 $mm^3$, which is less than that in Present Invention Example 2. The volume (V) of the chip pocket CP per one cutting edge can be changed in each multi-flute endmill by a means such as changing the values of the width angle a of the flank 6b of the end cutting edge 6 and the gash 7 opening angle b as explained above.

As shown in Table 2, the width w1 of the gash bottom surface 14 at the deepest part of the V-shaped gash 7 in Present Invention Example 2 was 0.35 mm, and thus it was sufficiently small. In contrast, the width w2 of the gash bottom surface 14 at the deepest part of the brachymorphic gash 7 in Comparative Example 2 was 0.9 mm, and thus it was large.

With regard to the angle φ in Comparative Example 2, as shown in FIG. 21, since the gash 7 was formed such that the rake face 6a of the end cutting edge and the gash face 7a are parallel, the angle φ could not be measured.

TABLE 2

| Specification Item | Present Invention Example 2 | Comparative Example 2 |
|---|---|---|
| Number of cutting edges | 12 | 15 |
| Inclination angle α of peripheral cutting edge | 8° | (same as left) |
| Curvature radius r1 of corner R edge | 1 mm | (same as left) |
| Deflection angle of flute | 30° | (same as left) |
| Rake angle of connecting part of corner R edge and peripheral cutting edge (cross-section perpendicular to axis) | 7° | 0° (rake face 5a is not provided) |
| Flank angle of peripheral cutting edge (edge-orthogonal cross-section) | 6° | (same as left) |
| Flank angle of corner R edge (edge-orthogonal cross-section) | 6° | 7° |
| Flank angle of end cutting edge (edge-orthogonal cross-section) | 6° | 8° |
| Angle β of end gash | 20° | 7° |
| Width angle a of flank of end cutting edge | 8° | 11° |

TABLE 2-continued

| Specification Item | Present Invention Example 2 | Comparative Example 2 |
|---|---|---|
| Gash opening angle b | 22° | 13° |
| b/a | 2.75 | 1.2 |
| Volume (V) of chip pocket per one cutting edge | 45 mm$^3$ | 23 mm$^3$ |
| Edge length L3 | 6 mm | (same as left) |
| Flute length h | 8 mm | (same as left) |
| Angle φ | 18° | unmeasureable |
| Inclination angle ξ | 10° | 48° |
| Inclination angle η | 7° | 12° |
| Width of gash bottom surface | 0.35 mm | 0.9 mm |

Regarding the material to be cut used in Experimental Example 2, similar to Experimental Example 1, a block material (aging treated) of a nickel-based super-heat-resistant alloy was attached to 3-axis vertical machining center such that the inclination angle is 10°, and pull-up processing was performed on the inclined surface (inclination angle of 10°) of the block material. In Present Invention Example 2, the wear condition of the cutting edges and the like was visually observed when the cumulative cutting distance reached 5.5 m, and in Comparative Example 2, the wear condition of the cutting edges and the like was visually observed when the cumulative cutting distance reached 4 m. In cutting of the material to be cut using the 3-axis vertical machining center, the cutting conditions that were set are as follows: the feed rate in Present Invention Example 2 was 1608 mm/min (the feed amount per one cutting edge fz was 0.1 mm/t), the feed rate in Comparative Example 2 was 2010 mm/min (the feed amount per one cutting edge fz was 0.1 mm/t), and the remaining conditions were the same as in Experimental Example 1.

In Experimental Example 2, the reason that the feed rate in Comparative Example 2 was set higher than that in Present Invention Example 2 is that, since the number of cutting edges of the multi-flute endmill of Comparative Example 2 was 15 and thus greater than that of Present Invention Example 2, the condition of wear on the cutting edges was observed when cutting in which the feed amount per one cutting edge fz was set to be equivalent was performed.

The dimensions of the multi-flute endmills 1 used in Experimental Example 2 are the same as those in Experimental Example 1 for both Present Invention Example 2 and Comparative Example 2 (the total length was 125 mm, the edge diameter L2 at the connecting part of the peripheral cutting edge 4 and the corner R edge 5 was 19 mm, and the shank diameter (edge diameter L1 at the peripheral cutting edge formation starting point) was 20 mm). The hard coating was also the same as that in Experimental Example 1.

Figure 14:
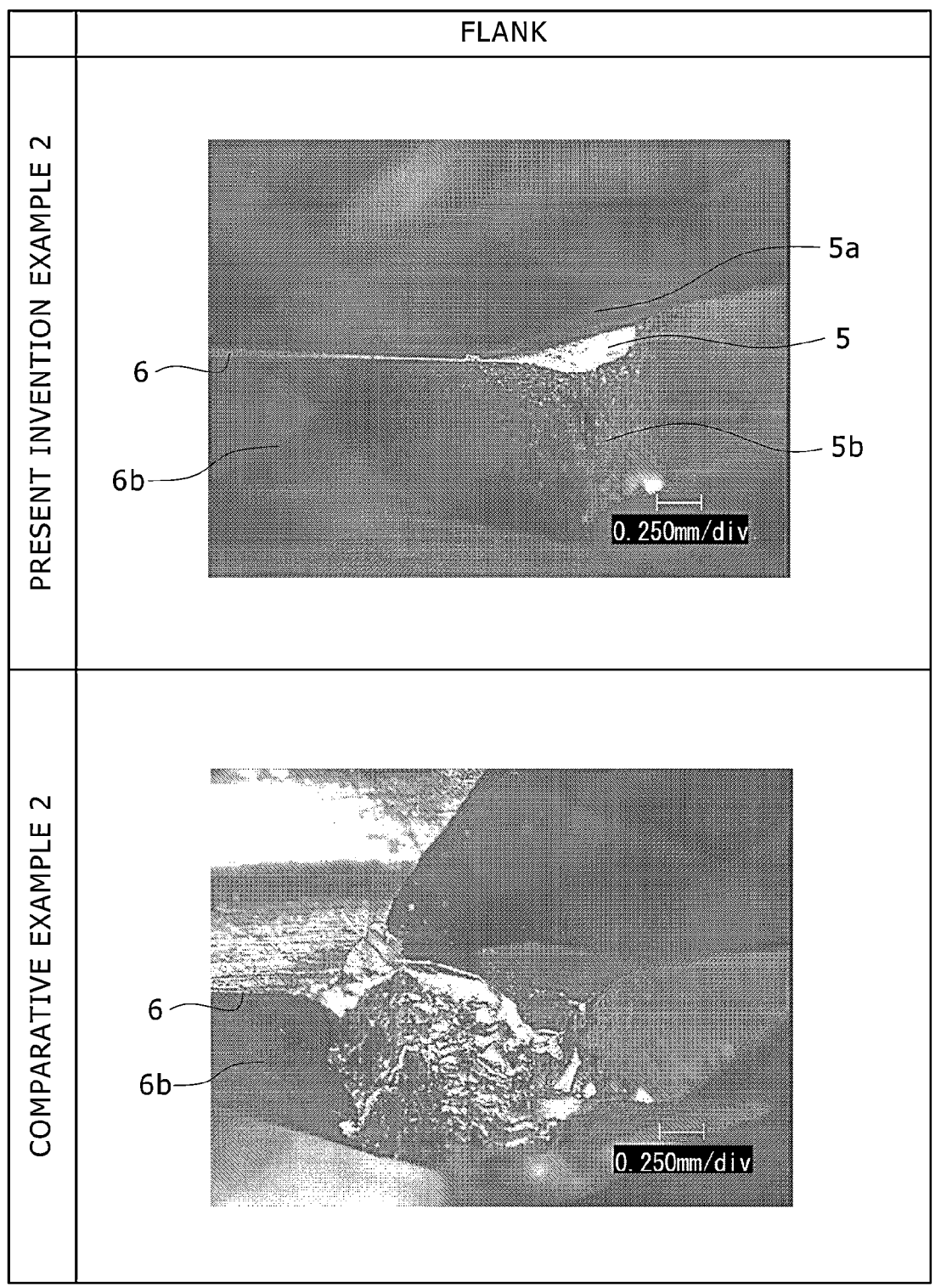
FIG. 14 shows pictures illustrating the condition of wear of the flanks of the cutting edges after conducting the cutting experiment of Experimental Example 2 using the multi-flute endmill of Present Invention Example 2 and the multi-flute endmill according to Comparative Example 2.
Figure 15:
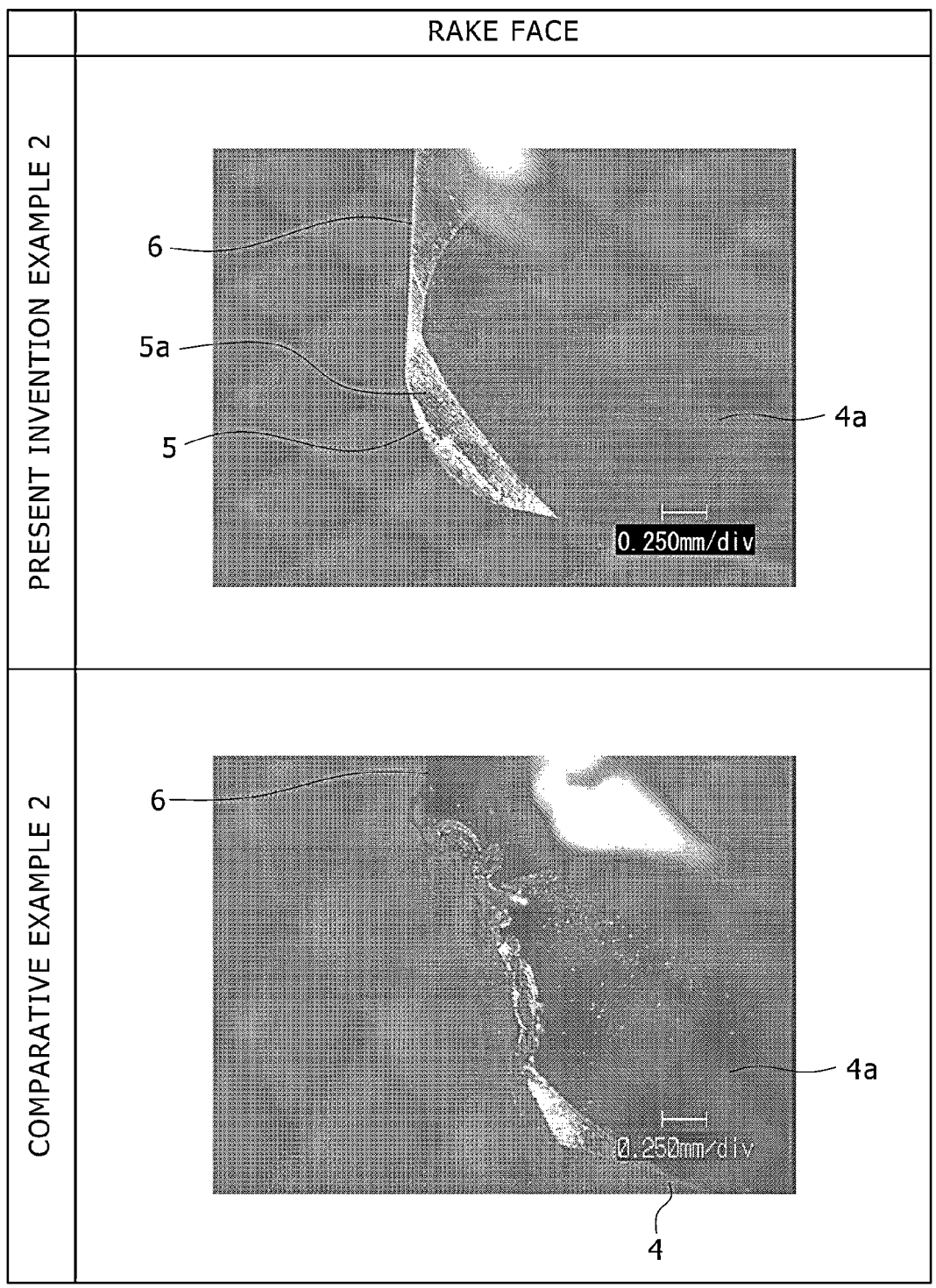
FIG. 15 shows pictures illustrating the condition of wear of the rake faces of the cutting edges after conducting the cutting experiment of Experimental Example 2 using the multi-flute endmill of Present Invention Example 2 and the multi-flute endmill according to Comparative Example 2.

The results of the cutting experiment according to Experimental Example 2 are shown in FIGS. 14 and 15. FIG. 14 shows pictures illustrating the condition of wear of the flanks of the cutting edges after conducting the cutting experiment of Experimental Example 2 using the multi-flute endmill of Present Invention Example 2 and the multi-flute endmill according to Comparative Example 2. FIG. 15 shows pictures illustrating the condition of wear of the rake faces of the cutting edges after conducting the cutting experiment of Experimental Example 2 using the multi-flute endmill of Present Invention Example 2 and the multi-flute endmill according to Comparative Example 2.

In FIG. 14, the pictures of the flanks of Present Invention Example 2 and Comparative Example 2 were photographed from the side of the flank 6b of the end cutting edge 6. In FIG. 15, the pictures of the rake faces of Present Invention Example 2 and Comparative Example 2 were photographed from the side of the rake face 5a of the corner R edge of the present invention example. Further, the numerical values "0.250 mm/div" and the like displayed in the bottom right side of the pictures indicate the scale of the picture (length per scale graduation).

As is clear from FIGS. 14 and 15, in Present Invention Example 2 in which the rake face 5a is provided to the corner R edge 5 and the volume (V) of the chip pocket CP per one cutting edge is 45 mm$^3$ and thus larger than that of Comparative Example 2, the rake face 5a of the corner R edge 5 exhibited a stable wear condition.

In contrast, in the multi-flute endmill of Comparative Example 2, as shown in FIGS. 14 and 15, in the corner R edge 5 (disappeared due to defects), the occurrence of defects thought to be caused by jamming of chips was confirmed. Due to such defects, the corner R edge 5 in the multi-flute endmill of Comparative Example 2 almost completely disappeared, and it was found that the corner R edge 5 had an extremely short life compared to the multi-flute endmill of Present Invention Example 2.

From the results of Experimental Example 2 described above, the following was revealed.

In Comparative Example 2, which was constituted similar to the multi-flute endmill of Patent Document 3, the number of cutting edges was 15, which is greater than that in Present Invention Example 2, the volume (V) of the chip pocket CP per one cutting edge set higher than that in Present Invention Example 2, and cutting was performed at a feed rate Vf that was higher than that in Present Invention Example 2. It is presumed that these settings led to the occurrence of defects thought to be caused by jamming of chips. In Comparative Example 2, the occurrence of defects can be inferred to have been caused by the matters in (1) and (2) below.

(1) Normally, in Present Invention Example 2 and Comparative Example 2, when the axial direction cutting depth ap is the same, it is theoretically possible to raise the feed rate when the number of cutting edges is increased so that the cutting load on each cutting edge of the endmill is equivalent. However, in Experimental Example 2, the angle β of the gash of the endmill of Comparative Example 2 was set to an extremely small value of 7° compared to that of Present Invention Example 2, and thus the volume of the chip pocket CP per one cutting edge was small. Therefore, in Comparative Example 2, it is inferred that the chips generated during processing accumulated easily and jamming of the chips occurred before they could be discharged to the outer peripheral side, and thus defects such as chipping of the corner R edge 5 occurred beginning immediately after cutting.

(2) As is clear from (1) above, in the multi-flute endmill 1 of the present invention, the values of the width angle a of the flank of the end cutting edge, the gash opening angle b, and the gash angle β were appropriately set within the ranges described above in accordance with the number of cutting edges, and the volume (V) of the chip pocket CP per one cutting edge was also appropriately set within the range described above. Therefore, the occurrence of chipping and defects on the corner R edge 5 was suppressed even when performing high-feed cutting, and thus stable cutting could be realized.

POSSIBILITIES FOR INDUSTRIAL APPLICABILITY

The examples above were directed to cases in which a nickel-based heat-resistant alloy material was used as the material to be cut (impeller) in high-feed cutting, but the present invention is not limited to such cases. For example, when performing high-feed processing on an alloy material that is difficult to cut such as a titanium alloy or stainless steel, the endmill of the present invention achieves advantageous effects. Further, the endmill of the present invention can also achieve advantageous effects when performing high-feed cutting on alloy steel, tool steel, carbon steel, and the like as the material to be cut.

EXPLANATION OF THE REFERENCE NUMERALS

1 . . . multi-flute endmill
   1a . . . tip of multi-flute endmill
2 . . . shank
3 . . . cutting edge part
4 . . . peripheral cutting edge
   4a . . . rake face of peripheral cutting edge
   4b . . . flank of peripheral cutting edge
   4n . . . flank angle at edge-orthogonal cross-section of peripheral cutting edge
   4s: rake angle at edge-orthogonal cross-section of peripheral cutting edge
5 . . . corner R edge
   5a . . . rake face of corner R edge
   5b . . . flank of corner R edge
   5n . . . flank angle at edge-orthogonal cross-section of corner R edge
   5s: rake angle at edge-orthogonal cross-section of corner R edge
6 . . . end cutting edge
   6a . . . rake face of end cutting edge
   6b . . . flank of end cutting edge
   6n . . . flank angle at edge-orthogonal cross-section of end cutting edge
7 . . . gash
   7a . . . gash face
8 . . . flute
   8a . . . flute face
9 . . . border line of rake face of end cutting edge and gash face
10 . . . step part
11 . . . multi-flute endmill having 10 cutting edges
12 . . . multi-flute endmill having 15 cutting edges
13 . . . endmill disclosed in Patent Document 3
14 . . . gash bottom surface
O . . . tool axis (rotation axis center)
R . . . rotation direction
CP . . . chip pocket
a . . . width angle of flank of end cutting edge
b . . . gash opening angle
h . . . flute length
r1 . . . curvature radius of R-shaped part of corner R edge
L1 . . . edge diameter of multi-flute endmill at peripheral cutting edge formation starting point
L2 . . . edge diameter of multi-flute endmill at connecting part of peripheral cutting edge and corner R edge
L3 . . . edge length
P1 . . . peripheral cutting edge formation starting point
P2 . . . connecting part of peripheral cutting edge and corner R edge
P2n . . . flank angle in cross-section perpendicular to axis at connecting part P2
P2s . . . rake angle in cross-section perpendicular to axis at connecting part P2
w1, w2 . . . width of gash bottom surface $\alpha$ . . . inclination angle
$\beta$ . . . gash angle
$\theta$ . . . helix angle

The invention claimed is:

1. A multi-flute endmill comprising:
a cutting edge part having multiple cutting edges, each consisting of an end cutting edge formed on a tip side of a shank from a tool axis side to an outer peripheral side in a radial direction of the shank, a corner R edge that is continuous with the end cutting edge, and a peripheral cutting edge that is continuous with the corner R edge; and
flutes formed between adjacent cutting edges in a rotation direction around the tool axis, wherein
a rake face of the cutting edge is formed from a rake face of the end cutting edge from the tool axis side to the outer peripheral side of the shank, a rake face of the corner R edge is adjacent to the rake face of the end cutting edge and forms a surface different from the rake face of the end cutting edge, and a rake face of the peripheral cutting edge is adjacent to the rake face of the corner R edge and forms a surface different from both the rake face of the corner R edge and the rake face of the end cutting edge,
the rake face of the peripheral cutting edge is positioned on a rearward side in the rotation direction R relative to the rake face of the end cutting edge,
the rake face of the peripheral cutting edge is adjacent to the rake face of the corner R edge at an end on the corner R edge side and also serves as one flute face that constitutes the flute, and the rake face of the corner R edge is adjacent to the rake face of the end cutting edge at an end on the tool axis side,
a gash that is in communication with the flute is formed between the rake face of the end cutting edge and a flank of an end cutting edge that is adjacent on a forward side thereof in the rotation direction, and the rake face of the end cutting edge also serves as one surface that constitutes the gash,
the rake face of the end cutting edge and a gash face that opposes the rake face on the forward side in the rotation direction which constitute the gash create intersecting surfaces that respectively include different intersecting straight lines in the radial direction that pass through the tool axis O in a cross-section S1 that is orthogonal to the tool axis O, wherein the intersecting surfaces mutually form an angle $\phi$ in the rotation direction on the tool axis,
at least the gash face forms a surface that is inclined toward the rearward side in the rotation direction from the tip to a middle of the shank relative to a flat surface including one of the straight lines in the radial direction that passes through the tool axis,
the flute is formed from the rake face of the peripheral cutting edge that also serves as one flute face and a flute face that opposes the rake face of the peripheral cutting edge on the forward side in the rotation direction,
the flute face that opposes the rake face of the peripheral cutting edge is inclined relative to the gash face toward the forward side in the rotation direction from the inner peripheral side in the radial direction to the outer peripheral side in the radial direction of the cutting edge part and inclined toward the rearward side in the rotation direction from the tip to the middle of the cutting edge part, the flute has a groove having an inner end toward the tool axis, and the gash has a groove having an outer end toward the outer peripheral side, the inner end of the groove of the flute is positioned more toward the rearward side in the rotation direction, than the outer end of the groove of the gash is positioned with respect to the rearward side, and in the radial direction, the inner end of the groove of the flute is closer to the tool axis, than the outer end of the groove of the gash is to the tool axis.

2. The multi-flute endmill according to claim 1, wherein the rake face of the peripheral cutting edge that also serves as one flute face of the flute forms a surface that is inclined such that its outer peripheral side or inner peripheral side in the radial direction creates an inclination angle η to the rearward side in the rotation direction relative to the rake face of the end cutting edge.

3. The multi-flute endmill according to claim 2, wherein the gash is formed in a fan shape that has a central angle when viewing the shank in the tool axis O direction.

4. The multi-flute endmill according to claim 2, wherein the sum of the volumes of the flute and the gash is in the range of 25 mm$^3$ to 120 mm$^3$ when an edge diameter of the multi-flute endmill at a starting point of formation of the peripheral cutting edge is 10 mm to 30 mm and a number of cutting edges is 6 to 30.

5. The multi-flute endmill according to claim 2, wherein the peripheral cutting edge is formed to create an inclination toward the rearward side in the rotation direction from the tip to the middle of the multi-flute endmill in the tool axis direction of the shank and is continuous with the corner R edge, and an inclination angle α relative to the tool axis of the inclination is set to a range of from 5° or more to 10° or less.

6. The multi-flute endmill according to claim 2, wherein when the edge diameter of the multi-flute endmill at the starting point of formation of the peripheral cutting edges is 10 mm to 30 mm and the number of cutting edges is 6 to 30, the sum of the volumes of the flute and the gash is in the range of 25 mm$^3$ to 120 mm$^3$, the peripheral cutting edge is formed to create an inclination toward the rearward side in the rotation direction from the tip to the middle of the multi-flute endmill in the tool axis direction of the shank and is continuous with the corner R edge, and an inclination angle α relative to the tool axis of the inclination is set to a range of from 5° or more to 10° or less.

7. The multi-flute endmill according to claim 1, wherein the gash is formed in a fan shape that has a central angle when viewing the shank in the tool axis O direction.

8. The multi-flute endmill according to claim 7, wherein the sum of the volumes of the flute and the gash is in the range of 25 mm$^3$ to 120 mm$^3$ when an edge diameter of the multi-flute endmill at a starting point of formation of the peripheral cutting edge is 10 mm to 30 mm and a number of cutting edges is 6 to 30.

9. The multi-flute endmill according to claim 7, wherein the peripheral cutting edge is formed to create an inclination toward the rearward side in the rotation direction from the tip to the middle of the multi-flute endmill in the tool axis direction of the shank and is continuous with the corner R edge, and an inclination angle α relative to the tool axis of the inclination is set to a range of from 5° or more to 10° or less.

10. The multi-flute endmill according to claim 7, wherein when the edge diameter of the multi-flute endmill at the starting point of formation of the peripheral cutting edges is 10 mm to 30 mm and the number of cutting edges is 6 to 30, the sum of the volumes of the flute and the gash is in the range of 25 mm$^3$ to 120 mm$^3$, the peripheral cutting edge is formed to create an inclination toward the rearward side in the rotation direction from the tip to the middle of the multi-flute endmill in the tool axis direction of the shank and is continuous with the corner R edge, and an inclination angle α relative to the tool axis of the inclination is set to a range of from 5° or more to 10° or less.

11. The multi-flute endmill according to claim 1, wherein the sum of the volumes of the flute and the gash is in the range of 25 mm$^3$ to 120 mm$^3$ when an edge diameter of the multi-flute endmill at a starting point of formation of the peripheral cutting edge is 10 mm to 30 mm and a number of cutting edges is 6 to 30.

12. The multi-flute endmill according to claim 11, wherein the peripheral cutting edge is formed to create an inclination toward the rearward side in the rotation direction from the tip to the middle of the multi-flute endmill in the tool axis direction of the shank and is continuous with the corner R edge, and an inclination angle α relative to the tool axis of the inclination is set to a range of from 5° or more to 10° or less.

13. The multi-flute endmill according to claim 1, wherein the peripheral cutting edge is formed to create an inclination toward the rearward side in the rotation direction from the tip to the middle of the multi-flute endmill in the tool axis direction of the shank and is continuous with the corner R edge, and an inclination angle α relative to the tool axis of the inclination is set to a range of from 5° or more to 10° or less.

14. The multi-flute endmill according to claim 1, wherein when the edge diameter of the multi-flute endmill at the starting point of formation of the peripheral cutting edges is 10 mm to 30 mm and the number of cutting edges is 6 to 30, the sum of the volumes of the flute and the gash is in the range of 25 mm$^3$ to 120 mm$^3$, the peripheral cutting edge is formed to create an inclination toward the rearward side in the rotation direction from the tip to the middle of the multi-flute endmill in the tool axis direction of the shank and is continuous with the corner R edge, and an inclination angle α relative to the tool axis of the inclination is set to a range of from 5° or more to 10° or less.

* * * * *